US006458165B1

(12) United States Patent
Foucher et al.

(10) Patent No.: US 6,458,165 B1
(45) Date of Patent: Oct. 1, 2002

(54) MARKING PARTICLES

(75) Inventors: Daniel A. Foucher, Rochester, NY (US); Raj D. Patel; Naveen Chopra, both of Oakville (CA); Peter M. Kazmaier, Mississauga (CA); James Wojtyk, Ottawa (CA); Erwin Buncel, Kingston (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/042,343

(22) Filed: Jan. 11, 2002

Related U.S. Application Data

(62) Division of application No. 09/864,475, filed on May 24, 2001, now Pat. No. 6,365,312.

(51) Int. Cl.[7] ............................ G09F 9/32; G06K 19/06

(52) U.S. Cl. ................. 3559/296; 235/487; 430/108.21

(58) Field of Search ................. 430/108.21; 106/31.17; 345/84, 85, 107; 235/487; 359/296

(56) References Cited

U.S. PATENT DOCUMENTS

| | | | |
|---|---|---|---|
| 4,725,522 A | 2/1988 | Breton et al. | 430/138 |
| 4,727,011 A | 2/1988 | Mahabadi et al. | 430/138 |
| 4,766,051 A | 8/1988 | Breton et al. | 430/138 |
| 4,851,318 A | 7/1989 | Hsieh et al. | 430/137 |
| 4,855,209 A | 8/1989 | Martin et al. | 430/126 |
| 4,937,167 A | 6/1990 | Moffat et al. | 430/137 |
| 5,051,779 A | 9/1991 | Hikawa | 355/200 |
| 5,091,966 A | 2/1992 | Bloomberg et al. | 382/21 |
| 5,128,525 A | 7/1992 | Stearns et al. | 235/454 |
| 5,168,147 A | 12/1992 | Bloomberg | 235/456 |
| 5,291,243 A | 3/1994 | Heckman et al. | 355/201 |
| 5,337,361 A | 8/1994 | Wang et al. | 380/51 |
| 5,551,973 A | 9/1996 | Oliver et al. | 106/22 B |
| 5,593,486 A | 1/1997 | Oliver et al. | 106/22 A |
| 5,633,109 A | 5/1997 | Jennings et al. | 430/115 |
| 5,710,420 A | 1/1998 | Martin et al. | 235/487 |
| 5,759,729 A | 6/1998 | Martin et al. | 430/106 |

FOREIGN PATENT DOCUMENTS

| | | |
|---|---|---|
| EP | 459792 A2 | 12/1991 |
| EP | 469864 A2 | 2/1992 |

OTHER PUBLICATIONS

James T.C. Wojtyk, Peter M. Kazmaier and Erwin Buncel, Effects of Metal Ion Complexation on the Spiropyran–Merocyanine Interconversion: Development of a Thermally Stable Photo–Switch, Chem. Commun., 1998, p. 1703.

*Primary Examiner*—John Goodrow
(74) *Attorney, Agent, or Firm*—Judith L. Byorick

(57) ABSTRACT

Disclosed are marking particles comprising a first polymer a second polymer, a chelating agent, and a spiropyran material of the formula

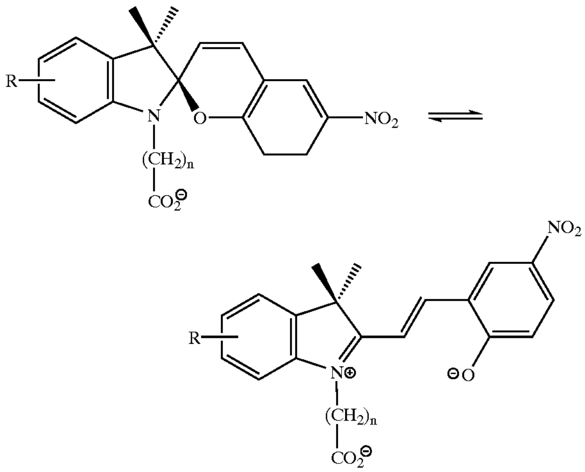

or

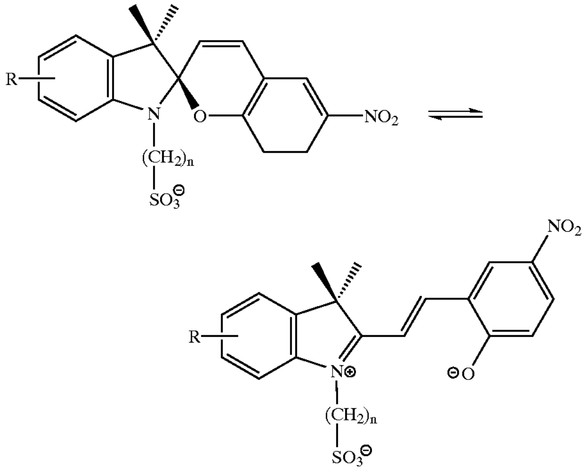

wherein n is an integer representing the number of repeat $—CH_2—$ units and R is —H or $—CH{=}CH_2$. The marking particles comprise a core containing the first polymer in which is dispersed the chelating agent and the spiropyran and encapsulated within a shell of the second polymer formulated by an interfacial polymerization.

23 Claims, No Drawings

MARKING PARTICLES

This is a Divisional of application Ser. No. 09/864,475 filed May 24, 2001, now U.S. Pat. No. 6,365,312.

Copending application U.S. Ser. No. 09/864,386, filed concurrently herewith, entitled "Photochromic Gyricon Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses a display comprising an arrangement of a plurality of optically anisotropic rotatable elements, each of said rotatable elements having a surface in contact with an enabling fluid, said rotatable elements being electrically dipolar in the presence of the enabling fluid and thus being subject to rotation upon application of an electric field, said rotatable elements being free to rotate in place but not free to translate substantially so as to disrupt the arrangement of rotatable elements, wherein a first portion of said surface contains a mixture of a chelating agent and a spiropyran material of the formula

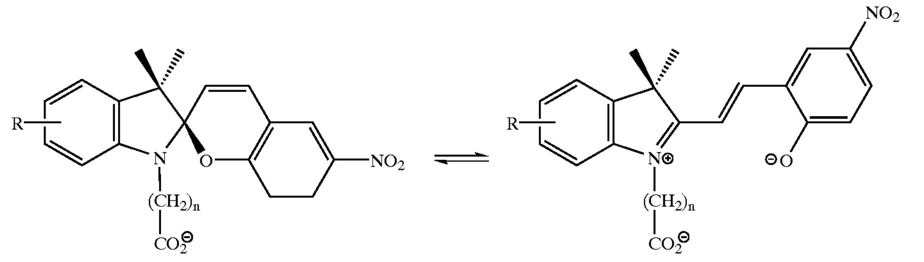

or

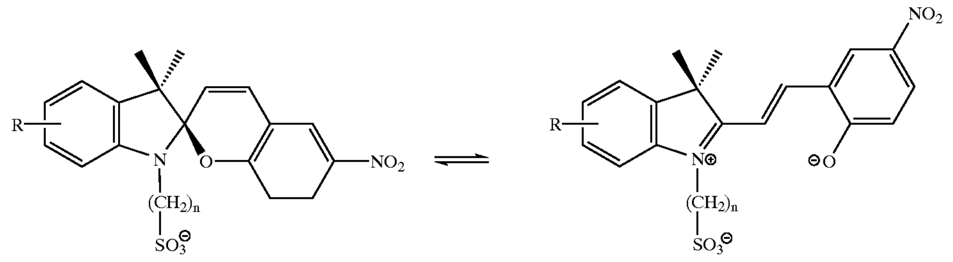

wherein n is an integer representing the number of repeat $—CH_2—$ units and R is —H or $—CH{=}CH_2$, and wherein a second portion of said surface contains substantially no spiropyran.

Copending application U.S. Ser. No. 09/864,535, filed concurrently herewith, entitled "Photochromic Electrophoretic Ink Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses an electrophoretic ink comprising a suspending fluid and, suspended in the suspending fluid, a plurality of particles comprising a mixture of a chelating agent and a spiropyran material of the formula

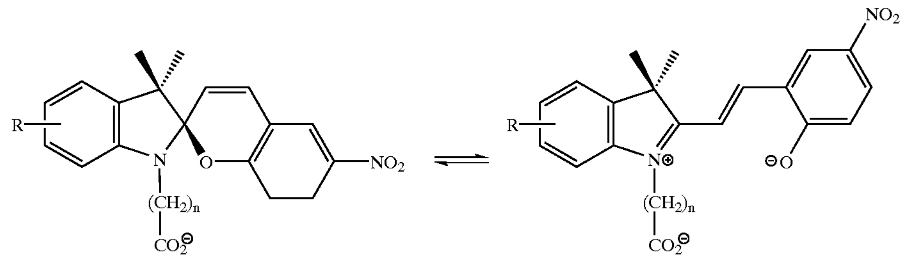

or

-continued

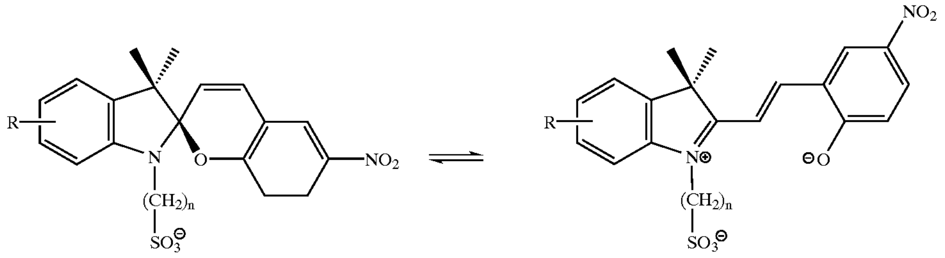

wherein n is an integer representing the number of repeat $-CH_2-$ units and R is —H or $-CH{=}CH_2$, said particles being free to migrate within said suspending fluid under the influence of an electric field.

Copending application U.S. Ser. No. 09/864,535, now U.S. Pat. No. 6,358,655, filed concurrently herewith, entitled "Marking Particles,"with the named inventors Daniel A. Foucher, Raj D. Patel, Naveen Chopra, and Peter M. Kazmaier, the disclosure of which is totally incorporated herein by reference, discloses marking particles comprising a resin, a chelating agent, and a spiropyran material which is of the formula

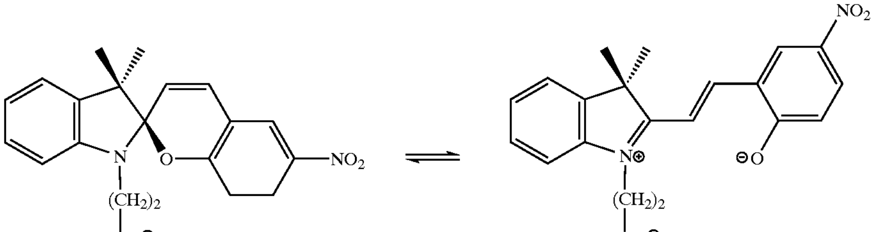

or

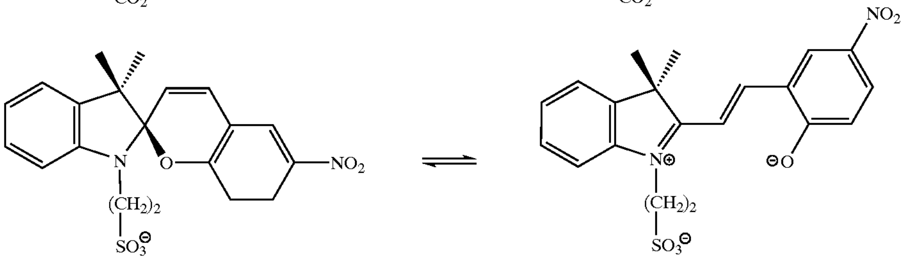

The marking particles are prepared by an emulsion aggregation process.

BACKGROUND OF THE INVENTION

The present invention is directed to marking materials for generating images. More specifically, the present invention is directed to marking particles containing a photochromic spiropyran material. One embodiment of the present invention is directed to marking particles comprising a first polymer, a second polymer, a chelating agent, and a spiropyran material of the formula

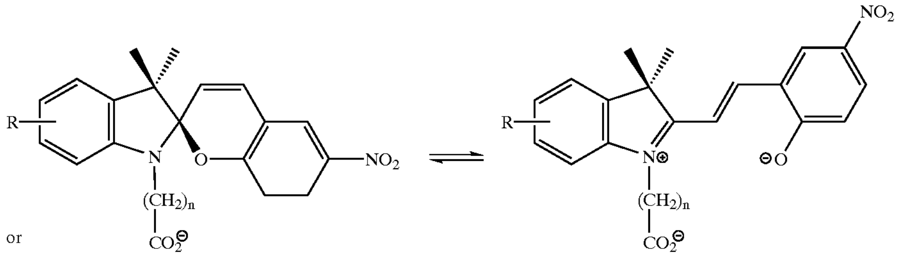

or

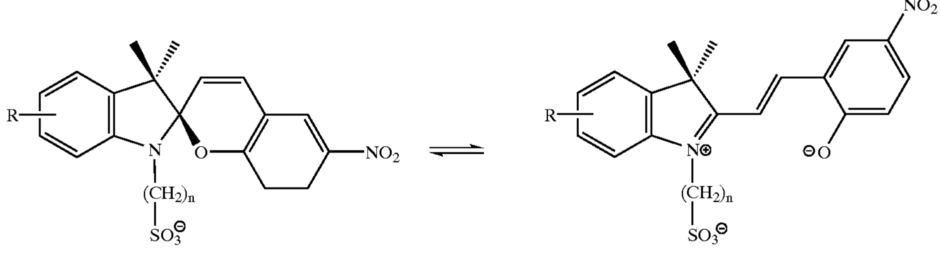

wherein n is an integer representing the number of repeat $—CH_2—$ units and R is —H or $—CH{=}CH_2$. The marking particles comprise a core containing the first polymer in which is dispersed the chelating agent and the spiropyran and encapsulated within a shell of the second polymer formulated by an interfacial polymerization.

The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. Toner typically comprises a resin and a colorant. The toner will normally be attracted to those areas of the photoreceptor which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Many methods are known for applying the electroscopic particles to the electrostatic latent image to be developed. One development method, disclosed in U.S. Pat. No. 2,618,552, the disclosure of which is totally incorporated herein by reference, is known as cascade development. Another technique for developing electrostatic images is the magnetic brush process, disclosed in U.S. Pat. No. 2,874,063. This method entails the carrying of a developer material containing toner and magnetic carrier particles by a magnet. The magnetic field of the magnet causes alignment of the magnetic carriers in a brushlike configuration, and this "magnetic brush" is brought into contact with the electrostatic image bearing surface of the photoreceptor. The toner particles are drawn from the brush to the electrostatic image by electrostatic attraction to the undischarged areas of the photoreceptor, and development of the image results. Other techniques, such as touchdown development, powder cloud development, and jumping development are known to be suitable for developing electrostatic latent images.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, oxazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

Methods for encoding machine-readable information on documents, packages, machine parts, and the like, are known. One-dimensional symbologies, such as those employed in bar codes, are known. Two-dimensional symbologies generally are of two types: matrix codes and stacked bar codes. Matrix codes typically consist of a random checker board of black and white squares. Alignment features such as borders, bullseyes, start and stop bits, and the like, are included in the matrix to orient the matrix during scanning. Stacked bar codes consist of several one-dimensional bar codes stacked together. Two-dimensional symbologies have an advantage over one-dimensional symbologies of enabling greater data density. For example, a typical bar code can contain from about 9 to about 20 characters per inch, while a typical two-dimensional symbology can contain from about 100 to about 800 characters per square inch. Many two-dimensional symbologies also utilize error correction codes to increase their robustness. Examples of two-dimensional symbologies include PDF417, developed by Symbol Technologies, Inc., Data Matrix, developed by International Data Matrix, Vericode, developed by Veritec, Inc., CP Code, developed by Teiryo, Inc. and Integrated Motions, Inc., Maxicode, developed by the United Parcel Service, Softstrip, developed by Softstrip, Inc., Code One, developed by Laserlight Systems, Supercode, developed by Metanetics Inc., DataGlyph, developed by Xerox Corporation, and the like. One-dimensional and two-dimensional symbologies can be read with laser scanners or with video cameras. The scanners typically consist of an imaging detector coupled to a microprocessor for decoding. Scanners can be packaged into pen-like pointing devices or guns. Bar-like codes and methods and apparatus for coding and decoding information contained therein are disclosed in, for example, U.S. Pat. Nos. 4,692,603, 4,665,004, 4,728,984, 4,728,783, 4,754,127, 4,782,221, the disclosures of each of which are totally incorporated herein by reference.

European Patent Application 469,864-A2 (Bloomberg et al.), the disclosure of which is totally incorporated herein by reference, discloses self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned into an electronic document processing system. Moreover, for at least some applications, the glyphs desirably are composed of printed pixel patterns containing nearly the same number of on pixels and nearly the same number of off pixels, such that the code that is rendered by printing such glyphs on substantially uniformly spaced centers appears to have a generally uniform texture. In the case of codes printed at higher spatial densities, this texture is likely to be perceived as a generally uniform gray tone. Binary image processing and convolution filtering techniques for decoding such codes are also disclosed.

European Patent Application 459,792-A2 (Zdybel et al.), the disclosure of which is totally incorporated herein by reference, discloses the provision in electronic document processing systems for printing unfiltered or filtered machine-readable digital representations of electronic documents, and human-readable renderings of them on the same record medium using the same printing process. The integration of machine-readable digital representations of electronic documents with the human-readable hardcopy renderings of them may be employed, for example, not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human-readable content of the hardcopy renderings. In addition to storage of the electronic representation of the document, provision is made for encoding information about the electronic representation of the document itself, such as file name, creation and modification dates, access and security information, and printing histories. Provision is also made for encoding information which is computed from the content of the document and other information, for purposes of authentication and verification of document integrity. Provision is also made for the encoding of information which relates to operations which are to be performed depending on handwritten marks made upon a hardcopy rendering of the document; for example, encoding instructions of what. action is to be taken when a box on a document is checked. Provision is also made for encoding in the hardcopy another class of information; information about the rendering of the document specific to that hardcopy, which can include a numbered copy of that print, the identification of the machine which performed that print, the reproduction characteristics of the printer, and the screen frequency and rotation used by the printer in rendering halftones. Provision is also made for encoding information about the digital encoding mechanism itself, such as information given in standard-encoded headers about subsequently compressed or encrypted digital information.

U.S. Pat. No. 5,128,525 (Stearns et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,291,243 (Heckman et al.), the disclosure of which is totally incorporated herein by reference, discloses a system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which become visible when copied, and/or are machine readable even in copies.

U.S. Pat. No. 5,168,147 (Bloomberg), the disclosure of which is totally incorporated herein by reference, discloses binary image processing techniques for decoding bitmap image space representations of self-clocking glyph shape codes of various types (e.g., codes presented as original or degraded images, with one or a plurality of bits encoded in each glyph, while preserving the discriminability of glyphs that encode different bit values) and for tracking the number and locations of the ambiguities (sometimes referred to. herein as "errors") that are encountered during the decoding of such codes. A substantial portion of the image processing that is performed in the illustrated embodiment of the invention is carried out through the use of morphological filtering operations because of the parallelism that is offered by such operations. Moreover, the error detection that is performed in accordance with this invention may be linked to or compared against the error statistics from one or more alternative decoding process, such as the convolution filtering process that is disclosed herein, to increase the reliability of the decoding that is obtained.

U.S. Pat. No. 5,091,966 (Bloomberg et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,051,779 (Hikawa), the disclosure of which is totally incorporated herein by reference, discloses an image processing system which specifies input image information on the basis of existence of a special mark or patterns printed on a job control sheet. Selected one of various image processings is executed in accordance with the existence of the special mark or patterns to thereby obtain output image information. Each of the special marks or patterns are line drawings, each drawn so as to have a certain low correlative angle to the longitudinal and transverse directions of an image provided with the special mark or patterns.

U.S. Pat. No. 5,337,361 (Wang et al.), the disclosure of which is totally incorporated herein by reference, discloses a record which contains a graphic image and an information area which are interrelated to discourage misuse of the record. The information area can overlay the graphic image and include information encoded in an error-correctable, machine-readable format which allows recovery of the information despite distortion due to the underlying graphic image. The record may also represent the image by words similar in form to words in the information area. Both the information and graphic words can then be altered when an action regarding the record takes place.

U.S. Pat. No. 4,766,051 (Breton et al.), the disclosure of which is totally incorporated herein by reference, discloses a cold pressure fixable colored toner composition comprising a core containing a polymer in which is dispersed pigment particles selected from the group consisting of cyan, magenta, red, yellow pigments, and mixtures thereof, other than carbon blacks and magnetites; and encapsulated within a polymeric shell formulated by an interfacial polymerization.

U.S. Pat. No. 4,725,522 (Breton et al.), the disclosure of which is totally incorporated herein by reference, discloses a process for the preparation of cold pressure fixable toner compositions which comprises (1) admixing a core component comprising pigment particles, a water insoluble organic solvent and elastomeric materials with a shell monomer dissolved therein; (2) dispersing the resulting mixture in a water phase containing a stabilizing material; (3) hydrolyzing by heating the resulting mixture; (4) subsequently effecting an interfacial polymerization of the aforementioned mixture; and (5) thereafter optionally washing the resulting toner composition.

U.S. Pat. No. 4,727,011 (Mahabadi et al.), the disclosure of which is totally incorporated herein by reference, discloses an improved process for the preparation of encapsulated toner compositions which comprises mixing in the absence of solvent a core monomer, an initiator, pigment particles, a first shell monomer, stabilizer, and water; thereafter adding a second shell monomer thereby enabling an interfacial polymerization reaction between the first, and second shell monomers; and subsequently effecting a free radical polymerization of the core monomer.

U.S. Pat. No. 4,855,209 (Martin et al.), the disclosure of which is totally incorporated herein by reference, discloses an encapsulated toner composition with a melting temperature of from about 65° C. to about 140° C. comprising a core containing a polymer selected from the group consisting of polyethylene succinate, polyhalogenated olefins, poly (alpha-alkylstyrenes), rosin modified maleic resins, aliphatic hydrocarbon resins, poly(epsilon-caprolactones), and mixtures thereof; and pigment particles, where the core is encapsulated in a shell prepared by interfacial polymerization reactions.

U.S. Pat. No. 4,851,318 (Hsieh et al.), the disclosure of which is totally incorporated herein by reference, discloses an improved process for the preparation of encapsulated toner compositions which comprises mixing core monomer(s), an initiator, or initiators, pigment particles, and oil soluble shell monomer(s); homogenizing the aforementioned mixture into an aqueous surfactant solution resulting in an oil-in-water suspension; thereafter adding water soluble shell monomer(s) to the oil-in-water suspension enabling an interfacial polymerization reaction between the oil soluble and the water soluble shell monomer(s); subsequently adding a low molecular weight polyethylene oxide surfactant protective colloid; and thereafter affecting a free-radical polymerization of the core monomer(s) by heating.

U.S. Pat. No. 4,937,167 (Moffat et al.), the disclosure of which is totally incorporated herein by reference, discloses a process for controlling the electrical characteristics of colored toner particles. The process comprises preparing a first core material comprising first pigment particles, core monomers, a free radical initiator, and optional polymer components; preparing a second core material which comprises second pigment particles, core monomers, a free radical initiator, and optional polymer components, said second pigment particles being of a different color from that of the first pigment particles; encapsulating separately the first core material and the second core material within polymeric shells by means of interfacial polymerization reactions between at least two shell monomers, of which at least one is soluble in aqueous media and at least one of which is soluble in organic media, wherein the polymeric shell encapsulating the first core material is of substantially the same composition as the polymeric shell encapsulating the second core material; and subsequently polymerizing the first and second core monomers via free radical polymerization, thereby producing two encapsulated heat fusible toner compositions of different colors with similar triboelectric charging characteristics.

U.S. Pat. No. 5,633,109 (Jennings et al.), the disclosure of which is totally incorporated herein by reference, discloses an ink composition which comprises an aqueous liquid vehicle, a photochromic material, and a vesicle-forming lipid, wherein vesicles of the lipid are present in the ink.

U.S. Pat. No. 5,593,486 (Oliver et al.), the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

U.S. Pat. No. 5,551,973 (Oliver et al.), the disclosure of which is totally incorporated herein by reference, discloses an ink composition which comprises an aqueous phase, an oil phase, a photochromic material, and a surfactant, said ink exhibiting d liquid crystalline gel phase at a first temperature and a liquid microemulsion phase at a second temperature higher than the first temperature.

U.S. Pat. No. 5,759,729 (Martin et al.), the disclosure of which is totally incorporated herein by reference, discloses a toner composition for the development of electrostatic latent images which comprises particles comprising a mixture of a resin and a photochromic material. Another embodiment of the present invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the present invention is directed to a liquid developer composition for the development of electrostatic latent images which comprises a nonaqueous liquid vehicle, a charge control agent, and toner particles comprising a mixture of a resin and a photochromic material.

U.S. Pat. No. 5,710,420 (Martin et al.), the disclosure of which is totally incorporated herein by reference, discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state.

James T. C. Wojtyk, Peter M. Kazmaier, and Erwin Buncel, "Effects of Metal Ion Complexation on the Spiropyran-Merocyanine Interconversion: Development of a Thermally Stable Photo-Switch," *Chem. Commun.* 1998, p. 1703, the disclosure of which is totally incorporated herein by reference, discloses spectrophotometric absorption and fluorescence measurements of spiropyrans

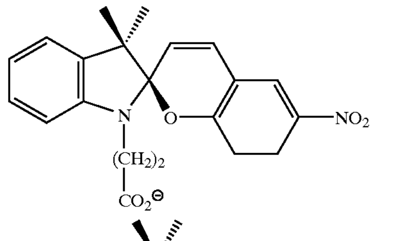

and

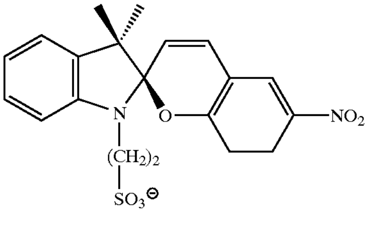

modified with chelating functionalities, in the presence of $Ca^{2+}$ and $Zn^{2+}$, that provide evidence of a thermally stable spiropyran-merocyanine photoswitch that is modulated by the metal cations.

While known compositions and processes are suitable for their intended purposes, a need remains for improved electrostatic toner compositions. In addition, a need remains for marking particles with photochromic characteristics. Further, a need remains for processes for preparing documents with images having photochromic characteristics. Additionally, a need remains for processes and materials that enable the placement of encoded information on documents which is not detectable to the reader but which is machine readable. There is also a need for photochromic marking particles that are thermally stable. In addition, there is a need for photochromic marking particles wherein both resonance forms of the photochromic material are stable. Further, there is a need for photochromic marking particles wherein the two resonance forms of the photochromic material are addressable at different wavelengths. Additionally, there is a need for photochromic marking particles wherein both resonance forms of the photochromic material are stable for reasonable periods of time without the need for constant irradiation to maintain the resonance form. A need also remains for materials and processes that generate images that cannot be easily or accurately photocopied or scanned.

SUMMARY OF THE INVENTION

The present invention is directed to marking particles comprising a first polymer, a second polymer, a chelating agent, and a spiropyran material of the formula

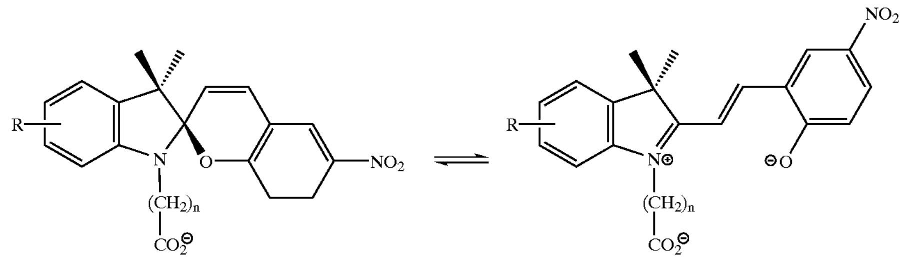

or

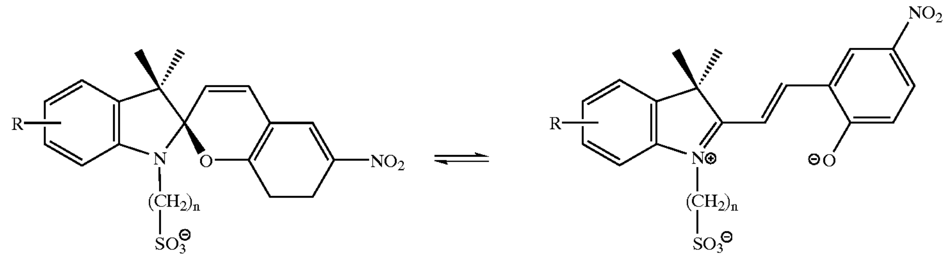

wherein n is an integer representing the number of repeat $—CH_2—$ units and R is —H or $—CH{=}CH_2$. The marking particles comprise a core containing the first polymer in which is dispersed the chelating agent and the spiropyran and encapsulated within a shell of the second polymer formulated by an interfacial polymerization.

DETAILED DESCRIPTION OF THE INVENTION

The marking particles of the present invention contain a spiropyran material of the formula

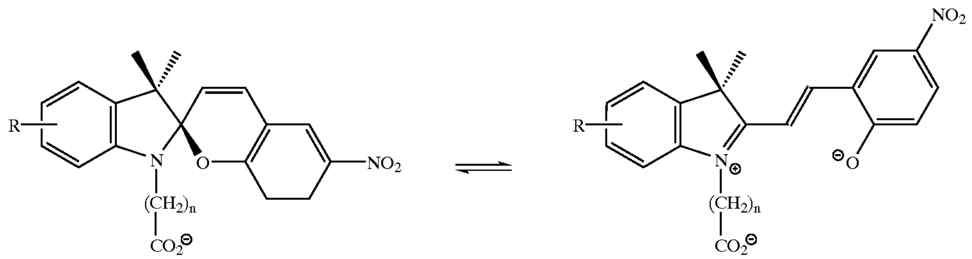

spiropyran (colorless) merocyanine (red)

or

-continued

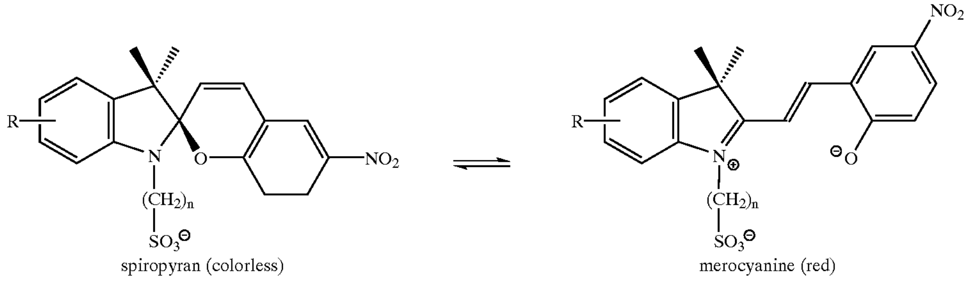

wherein n is an integer representing the number of repeat $-CH_2-$units, typically being from about 2 to about 8, although the value of n can be outside of this range, and R is —H or $-CH{=}CH_2$. The anionic $-COO^-$ and $-SO_3^-$ groups are, of course, accompanied by cations. Any desired or suitable cations can be employed. Materials of the formula

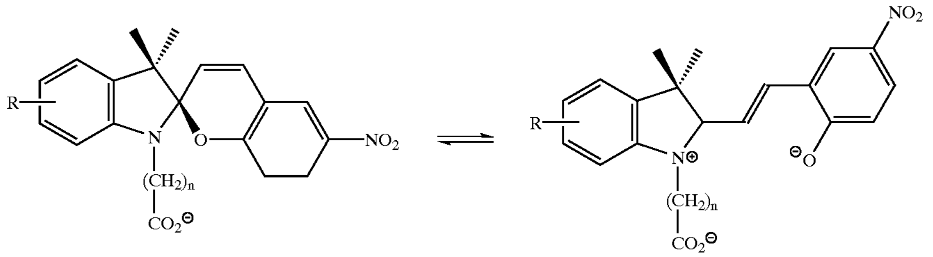

can be prepared by the reaction of 2,3,3-trimethylindolenine with β-iodopropionic acid, followed by condensation with 5-nitrosalicaldehyde in the presence of triethylamine. Materials of the formula

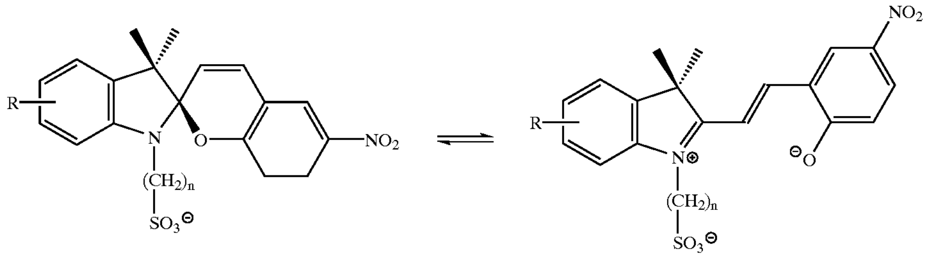

can be prepared by the reaction of 2,3,3-trimethylindolenine with γ-sulfone, followed by condensation with 5-nitrosalicaldehyde in the presence of triethylamine. The spiropyran is present in the marking particles in any desired or effective amount, typically at least about 0.01 percent by weight of the marking particles, preferably at least about 0.05 percent by weight of the marking particles, and more preferably at least about 0.5 percent by weight of the marking particles, and typically no more than about 5 percent by weight of the marking particles, although the amount can be outside of these ranges.

The marking particles of the present invention also contain a chelating agent with which the merocyanine form of the spiropyran can chelate to stabilize this form of the molecule. Examples of suitable chelating agents include metal salts in the +2 state, such as $Ca^{2+}$, $Zn^{2+}$, $Mg^{2+}$, transition metals, and the like, wherein the accompanying anion or anions are such that the metal salt is water soluble, such as nitrate, chloride, bromide, and the like. The chelating agent is present in the marking particles in any desired or effective amount, typically in a molar ratio to the spiropyran of at least about 1 mole of chelating agent for every 1 mole of spiropyran, preferably at least about 2 moles of chelating agent for every 1 mole of spiropyran, more preferably at least about 3 moles of chelating agent for every 1 mole of spiropyran, and even more preferably at least about 5 moles of chelating agent for every 1 mole of spiropyran, and typically no more than about 10 moles of chelating agent for every 1 mole of spiropyran, although there is no upper limit on the amount of chelating agent that can be present, and although the amount of chelating agent can be outside of these ranges.

In one specific embodiment, the spiropyran is incorporated into the backbone of the first polymer or the second polymer. In this embodiment, the spiropyran is first substituted with a vinyl group via Friedel-Crafts alkylation, and the spiropyran is then included as a comonomer in the polymerization process.

The marking particles of the present invention are formulated by an interfacial/free-radical polymerization process in which the shell formation and the core formation are controlled independently. The core materials selected for the marking particles are blended together, followed by encapsulation of these core materials within a polymeric material, optionally followed by core monomer polymerization. The encapsulation process generally takes place by means of an interfacial polymerization reaction, and the core monomer polymerization process generally takes by means of a free radical reaction. More specifically, the process includes preparing a core material by (A) mixing (1) a blend of either (a) a core monomer or monomers and one or more free radical polymerization initiators, or (b) a core polymer or polymers, (2) the spiropyran, (3) the chelating agent, and (4) a first shell monomer; (B) forming an organic liquid phase containing the core material which is dispersed into an aqueous phase containing a water soluble surfactant to form an oil in water suspension: and (C) addition of a water soluble second shell monomer during constant agitation, thus subjecting the mixture to an interfacial polymerization at room temperature. After the interfacial polymerization is complete and the shell of the second polymer is formed, the optional free radical polymerization of the core monomers within the encapsulated core is effected by increasing the temperature of the suspension, thereby enabling the initiator to initiate polymerization of the core monomers and resulting in marking particles comprising a polymeric core of the first polymer containing well-dispersed spiropyran and encapsulated by polymeric shell of the second polymer. When the core contains polymeric components prior to interfacial polymerization, the core polymerization step subsequent to interfacial polymerization can be omitted, and the first polymer comprises these polymeric components. When the core contains no polymeric components prior to interfacial polymerization, the first polymer present in the core is formed by the free radical polymerization of the core monomers subsequent to interfacial polymerization. Free radical polymerization of the core monomers generally is at a temperature of from about 50 to about 130° C., and preferably from abut 60 to about 120° C., for a period of from about 4 hours to about 24 hours. The marking particles are then washed to remove the stabilizing surfactants and subsequently dried, preferably utilizing the spray drying technique.

With respect to the polymeric core material, preformed polymers can be included as a component of the core. These polymers are compatible with and readily soluble in the core monomers. Examples of suitable polymers include polymers of the monomers listed below as suitable core monomers, as well as copolymers of these monomers, such as styrene-butadiene copolymers, styrene-acrylate and styrene-methacrylate copolymers, ethylene-vinylacetate copolymers, isobutylene-isoprene copolymers, and the like.

In addition, monomers can be present in the core during the particle.formation step, and subsequently these monomers can be polymerized in a free radical polymerization process to form the first polymer after the shell of the second polymer has been formed in an interfacial polymerization process. Typical core monomers include styrene, α-methylstyrene, vinyl toluene, n-alkyl methacrylates, n-alkyl acrylates, branched alkyl methacrylates, branched alkyl-acrylates, chlorinated olefins, butadiene, styrene-butadiene oligomers, ethylene-vinyl acetate oligomers, isobutylene-isoprene copolymer of low molecular weight where the weight-average molecular weight (Mw) ranges from about 5,000 to about 20,000 having residual double bonds, vinyl-phenolic materials, alkoxy alkoxy alkyl acrylates, alkoxy alkoxy alkyl methacrylates, cyano alkyl acrylates and methacrylates, alkoxy alkyl acrylates and methacrylates, methyl vinyl ether, maleic anhydride, and the like. These monomers can be present alone or as mixtures of monomers to form copolymers. The monomers can also be present in conjunction with preformed polymers so that subsequent polymerization of the core monomer results in a polymer blend, which can be both a compatible blend, wherein the polymers are miscible and form a uniform, homogeneous mixture, or an incompatible blend, wherein one polymer is present in discrete regions or domains within the other polymer.

Waxes or wax blends can also be added to the core in amounts of from about 0.5 to about 20 percent by weight of the core to improve the low melting properties and/or release properties of the marking particles. Specific examples of waxes include candelilla wax, bees wax, sugar cane wax, carnuba wax, paraffin wax, and other similar waxes, particularly those with a melting point of about 60° C.

Any suitable free radical initiator can be employed if the first polymer in the core is to be prepared by a free radical polymerization subsequent to the interfacial polymerization reaction that forms the shell of the second polymer, provided that the 10 hour half-life of the initiator is less than about 120° C., preferably less than about 90° C. Suitable free radical initiators include azo type initiators, such as 2,2'-azobis(isobutyronitrile), 2,2'-azobis(2,4-dimethylvaleronitrile), 2,2'-azobis(cyclohexanenitrile), 2,2'-azobis-(2-methylbutyronitrile), 2,2'-azobis(2,2'-azobis(2,4-dimethyl-4-methoxyvaleronitrile), or any combination thereof. Additional free radical initiators also include peroxide type initiators such as benzoyl peroxide, lauroyl peroxide and 2,5-dimethyl-2,5-bis(2-ethylhexanoylperoxy) hexane, Lupersol 256® (Pennwalt), or any combination thereof. Typically, a low temperature reacting initiator is present in the core material, being activated at temperatures of from about 50 to about 65° C. The low temperature initiator is generally present in an amount of from about 0.5 to about 6 percent by weight of the core monomers, and preferably from about 2 to about 4 percent by weight of the core monomers. Optionally, a high temperature initiator can also be present in the core material, being activated at temperatures of over 65° C. The high temperature initiator can be present in amounts of from 0 to about 2 percent by weight of the core monomers, and preferably from about 0.5 to about 1.25 percent by weight of the core monomers.

Suitable shell monomers for interfacial polymerization to form the second polymer generally are selected from monomers wherein the number of chemical reacting groups per molecule is two or more. The number of reacting groups per molecule is referred to as the chemical functionality. An organic soluble shell monomer which has a functionality of 2 or more reacts with an aqueous soluble shell monomer which has a functionality of 2 or more via interfacial polymerization to produce the shell of the second polymer. Examples of organic soluble shell monomers with a functionality equal to 2 are sebacoyl chloride, terephthaloyl chloride, phthaloyl chloride, isophthaloyl chloride, azeloyl chloride, glutaryl chloride, adipoyl chloride, and hexamethylene diisocyanate purchased from Fluka; 4,4'-dicyclohexylmethane diisocyanate (Desmodur W) and a 80:20 mixture of 2,4- and 2,6-toluene diisocyanate (TDI) purchased from Mobay Chemical Corporation; trans-1,4-cyclohexane diisocyanate purchased from Aldrich and 4,4'-methyldiphenyl diisocyanate (Isonate 125M and MDI) purchased from Upjohn. Examples of crosslinking organic soluble shell monomers which have a functionality greater than 2 are: 1,3,5-benzenetricarboxylic acid chloride, commercially available from Aldrich Chemical Co.; Isonate 143L (liquid MDI based on 4,4'-methyldiphenyl diisocyanate) commercially available from Upjohn; and tris(isocyanatophenyl) thiophosphate (Desmodur RF), commercially available from Mobay Chemical Corporation. Examples of monomers soluble in aqueous media and with a functionality of 2 include 1,6-hexanediamine, 1,4-bis(3-aminopropyl)piperazine, 2-methylpiperazine, m-xylene-α,α'-diamine, 1,8-diamino-ρ-menthane, 3,3'-diamino-N-methyldipropylamine, and 1,3-cyclohexanebis (methylamine), commercially available from Aldrich Chemical Co.; 1,4-diaminocyclohexane and 2-methylpentanediamine (Dyteck A), commercially available from DuPont; 1,2-diaminocyclohexane, 1,3-diaminopropane, 1,4-diaminobutane, 2,5-dimethylpiperazine, and piperazine, commercially available from Fluka; fluorine-containing 1,2-diaminobenzenes, commercially available from PCR Incorporated; and N,N'-dimethylethylenediamine, commercially available from Alfa. Other aqueous soluble shell monomers having a functionality greater than 2 are diethylenetriamine and bis(3-aminopropyl)amine, commercially available from Fluka, and tris(2-aminoethyl)amine, (TREN-HP), commercially available from W. R. Grace Company, and the like.

More than one organic phase monomer can be used to react with more than one aqueous phase monomer to form the shell of the second polymer. Although formation of the shell entails reaction between at least two shell monomers, one soluble in organic phase and one soluble in aqueous phase, as many as 5 monomers soluble in organic phase and as many as 5 monomers soluble in aqueous phase can be reacted to form the shell. In some preferred instances, as many as 2 monomers soluble in organic phase and as many as 2 monomers soluble in aqueous phase can be reacted to form the shell.

Another class of shell monomers which can be used in the aqueous phase or the organic phase as minor shell components are functionalized prepolymers. Prepolymers or macromers are long chain polymeric materials which have low mechanical integrity and low molecular weights, such as weight-average molecular weights of less than 1000, but have functional groups on each end of the molecule that react with the shell monomers and can be incorporated into the shell. Examples of such materials that are available for use in the organic phase are isocyanate prepolymers such as Adiprene L-83 and L-167 from DuPont and the like. The class of Jeffamine materials such as Jeffamine ED-600, ED-900, C-346, DU-700 and EDR-148, commercially available from Texaco, are aqueous prepolymers which can be incorporated into the shell as the aqueous soluble monomer and the like.

Shell polymers (the second polymer) suitable for use with the present invention include those which can be formed in an interfacial polymerization process. Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly(ester-amides), and the like, which can be formed in a polycondensation reaction of suitably terminated prepolymers or macromers with different condensation monomers. For example, a preformed alcohol terminated urethane prepolymer can be copolymerized with a diacyl halide to form a poly(ester-urethane) in an interfacial reaction, or an amine terminated amide prepolymer can be copolymerized with a diisocyanate to produce a poly(urea-amide) copolymer. Epoxy monomers or oligomers such as Epikote 819 can also be added in amounts of from about 0.01 percent to about 30 percent to copolymerize into the shell as strengthening agents. Various polyfunctional shell monomers, such as triamines, triisocyanates, and triols can be employed in small quantities of from about 0.01 percent to about 30 percent as crosslinking agents to introduce rigidity and strength into the shells.

A surfactant or emulsifier is generally added to disperse the hydrophobic particles in the form of marking particle size droplets in the aqueous medium and for stabilization of these droplets against coalescence or agglomeration prior to shell formation and encapsulation of the core. Many types of surfactants can be employed, such as polyvinylalcohol, polyethylene sulfonic acid salt, polyvinylsulfate ester salt, carboxylated polyvinylalcohol, water soluble alkoxylated diamines or similar water soluble block copolymers, gum arabic, polyacrylic acid salt, carboxymethylcellulose, hydroxypropylcellulose, hydroxyethylcellulose, quaternary amine functionalized cellulose derivatives such as JR 400, block copolymers of propylene oxide and ethylene oxide, gelatin, phthalated gelatin, and succinated gelatin salts of alginic acid. In addition, water soluble inorganic salts can also be employed to stabilize the dispersion, such as trisodium polyphosphate, tricalcium polyphosphate, and the like.

Examples of interfacial polymerization processes suitable for formation of the polymeric shell are also illustrated in, for example, U.S. Pat. Nos. 4,000,087 and 4,307,169, the disclosures of each of which are totally incorporated herein by reference.

The marking particles typically comprise from about 5 to about 50 percent by weight, and preferably from about 7 to about 25 percent by weight, of the polymeric shell, and typically from about 35 to about 90 percent by weight, and preferably from about 65 to about 87 percent by weight, of the core monomers and polymers, although the relative amounts can be outside of these ranges. Within the polymeric shell, the molar ratio of the organic soluble monomer to the aqueous soluble monomer is typically from about 1:1 to about 1:4, and preferably from about 1:1 to about 1:1.5, although the relative amounts can be outside of these ranges. When the core comprises a mixture of core monomers and polymers, the preformed polymers are present typically in an amount of from 0 to about 40 percent by weight, preferably from about 20 to about 35 percent by weight, of the monomer/polymer mixture, and the monomers are present typically in an amount of from about 60 to about 100 percent by weight, preferably from about 65 to about 80 percent by weight, of the monomer/polymer mixture, although the relative amounts can be outside of these ranges.

Surface charge control agents or additives can be added to the marking particles via numerous routes. These agents can be incorporated into the shell by adding the agent to the surfactant or emulsifier phase so that during interfacial polymerization of the shell the surface charge control agent is physically incorporated into the shell. This process is particularly suitable when one portion of the charge control agent is functionalized with a group such as an amine, so that the charge control agent reacts as a minor aqueous shell component and is chemically incorporated into the shell. During the interfacial polymerization, the surface charge control agent diffuses toward the outer boundary of the shell and is thus located on the shell surface. Examples of surface charge control agents suitable for incorporation into the shell material include fumed or colloidal silicas such as the Aerosils®, aluminas, talc powders, metal salts, metal salts of fatty acids such as zinc stearate, cetyl pyridinium salts, distearyl dimethyl ammonium methyl sulfate, and the like. Preferably the charge control agents are colorless compounds so as not to interfere with the purity of color of the marking particles. Typically, the surface charge enhancing additives when incorporated as a component of the shell are present in an amount of from about 0.1 percent to about 20 percent by weight of the aqueous shell component, although the amount can be outside of this range.

Surface charge control agents can also be blended onto the surfaces of the marking particles subsequent to particle formation. After particle formation and just prior to spray drying, the surface charge control agent can be added to the aqueous suspension of the washed particles, so that during the spray drying process the charge control agent adheres to the shell surface. Surface charge control additives can also be dry blended onto the dry marking particle surfaces in a tumbling/shearing apparatus such as a Lodige blender. Examples of surface charge control additives suitable for addition to the marking particle surfaces include fumed silicas or fumed metal oxides onto the surface of which have been deposited charge enhancing additives such as cetyl pyridinium chloride, distearyl dimethyl ammonium methyl sulfate, potassium tetraphenyl borate and the like. These surface treated silicas or metal oxides are typically treated with from about 5 to about 25 percent of the charge enhancing agent, although the amount can be outside of this range. The surface charging agents that can be physically absorbed to the marking particle surfaces by mechanical means are typically present in an amount of from about 0.01 percent to about 15 percent by weight of the marking particles, and preferably from about 0.1 percent to about 5 percent by weight of the marking particles, although the amount can be outside of these ranges.

Optionally, the marking particles of the present invention can also contain a colorant in addition to the spiropyran material. Typically, the colorant material is a pigment, although dyes can also be employed. Examples of suitable pigments and dyes are disclosed in, for example, U.S. Pat. Nos. 4,788,123, 4,828,956, 4,894,308, 4,948,686, 4,963,455, and 4,965,158, the disclosures of each of which are totally incorporated herein by reference. Specific examples of suitable dyes and pigments include carbon black, nigrosine dye, aniline blue, magnetites, and the like, as well as mixtures thereof. Colored pigments are also suitable for use with the present invention, including red, green, blue, brown, magenta, cyan, and yellow particles, as well as mixtures thereof, wherein the colored pigments are present in amounts that enable the desired color. Illustrative examples of suitable magenta pigments include 2,9-dimethyl-substituted quinacridone and anthraquinone dye, identified in the color index as CI 60710, CI Dispersed Red 15, a diazo dye identified in the color index as CI 26050, CI Solvent Red 19, and the like. Illustrative examples of suitable cyan pigments include copper tetra-4-(octadecyl sulfonamido) phthalocyanine, copper phthalocyanine pigment, listed in the color index as CI 74160, Pigment Blue, and Anthradanthrene Blue, identified in the color index as CI 69810, Special Blue X-2137, and the like. Illustrative examples of yellow pigments include diarylide yellow 3,3-dichlorobenzidene acetoacetanilides, a monoazo pigment identified in the color index as CI 12700, CI Solvent Yellow 16, a nitrophenyl amine sulfonamide identified in the color index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Other suitable colorants include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF). Colorants are typically present in the marking particles in an amount of from about 2 to about 20 percent by weight, although the amount can be outside this range.

Marking particles of the present invention can be used as toner particles for electrostatic latent imaging processes, and can be employed alone in single component development processes, or can be employed in combination with carrier particles in two component development processes. Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the disclosure of which is totally incorporated herein by reference. These carriers comprise nodular carrier beads of nickel characterized by surfaces of reoccurring recesses and protrusions that provide the particles with a relatively large external area. The diameters of the carrier particles can vary, but are typically from about 50 microns to about 1,000 microns, thus allowing the particles to possess sufficient density and inertia to avoid adherence to the electrostatic images during the development process.

Carrier particles can possess coated surfaces. Typical coating materials include polymers and terpolymers, including, for example, fluoropolymers such as polyvinylidene fluorides as disclosed in U.S. Pat. Nos. 3,526,533, 3,849,186, and 3,942,979, the disclosures of each of which are totally incorporated herein by reference. Coating of the carrier particles may be by any suitable process, such as powder coating, wherein a dry powder of the coating material is applied to the surface of the carrier particle and fused to the core by means of heat, solution coating, wherein the coating material is dissolved in a solvent and the resulting solution is applied to the carrier surface by tumbling, or fluid bed coating, in which the carrier particles are blown into the air by means of an air stream, and an atomized solution comprising the coating material and a solvent is sprayed onto the airborne carrier particles repeatedly until the desired coating weight is achieved. Carrier coatings may be of any desired thickness or coating weight. Typically, the carrier coating is present in an amount of from about 0.1 to about 1 percent by weight of the uncoated carrier particle, although the coating weight may be outside this range.

The toner particles are present in the two-component developer in any effective amount, typically from about 1 to about 5 percent by weight of the carrier, and preferably about 3 percent by weight of the carrier, although the amount can be outside of these ranges.

Any suitable conventional electrophotographic development technique can be utilized to deposit toner particles of the present invention on an electrostatic latent image on an imaging member. Well known electrophotographic development techniques include magnetic brush development, cascade development, powder cloud development, electrophoretic development, and the like. Magnetic brush development is more fully described in, for example, U.S. Pat. No. 2,791,949, the disclosure of which is totally incorporated herein by reference; cascade development is more fully described in, for example, U.S. Pat. Nos. 2,618,551 and 2,618,552, the disclosures of each of which are totally incorporated herein by reference; and powder cloud development is more fully described in, for example, U.S. Pat. Nos. 2,725,305, 2,918,910, and 3,015,305, the disclosures of each of which are totally incorporated herein by reference.

The deposited toner image can be transferred to a receiving member such as paper or transparency material by any suitable technique conventionally used in electrophotography, such as corona transfer, pressure transfer, adhesive transfer, bias roll transfer, and the like. Typical corona transfer entails contacting the deposited toner particles with a sheet of paper and applying an electrostatic charge on the side of the sheet opposite to the toner particles. A single wire corotron having applied thereto a potential of between about 5000 and about 8000 volts provides satisfactory transfer.

After transfer, the transferred toner image can be fixed to the receiving sheet. The fixing step can be also identical to that conventionally used in electrophotographic imaging. Typical, well known electrophotographic fusing techniques include heated roll fusing, flash fusing, oven fusing, laminating, adhesive spray fixing, and the like.

Images printed with the marking particles of the present invention are photochromic in that they have a first state corresponding to a first absorption spectrum and a second state corresponding to a second absorption spectrum. Another embodiment of the present invention is directed to a process which comprises (a) generating an electrostatic latent image on an imaging member; (b) developing the latent image by contacting the imaging member with marking particles according to the present invention and containing a photochromic material having a first state corresponding to a first absorption spectrum and a second state corresponding to a second absorption spectrum; and (c) thereafter effecting a photochromic change in at least some of the photochromic material in the developed image from the first state to the second state. In a specific embodiment, the present invention is directed to a method of embedding and recovering machine readable information on a substrate which comprises (a) writing data in a predetermined machine readable code format on the substrate with photochromic marking particles according to the present invention having a first state corresponding to a first absorption spectrum and a second state corresponding to a second absorption spectrum, and (b) thereafter effecting a photochromic change in at least some of the photochromic marking particles from the first state to the second state, wherein a first portion of the photochromic marking particles is caused to shift from the first state to the second state and a second portion of the photochromic marking particles remains in the first state. In one of these embodiments, the photochromic marking particles in the second state subsequently are caused to undergo another photochromic change, thereby returning them to the first state. In another of these embodiments, the machine readable code format comprises a set of distinguishable symbols including a first symbol for encoding 0s and a second symbol for encoding 1s, wherein the symbols are written on a substantially constant center-to-center spacing. In yet another of these embodiments, the machine readable code format comprises a set of glyphs wherein each glyph corresponds to a digital value of bit length n and wherein the set comprises $2^n$ distinctive shapes. In still another of these embodiments, the glyphs are elongated along axes that are tilted at angles of plus and minus about 450 with respect to a horizontal axis to discriminate at least some of said digital values from each other.

The photochromic shift from the first state to the second state can be effected by any method suitable for the photochromic material. Examples of methods for inducing the photochromic shift include irradiation with radiation of a suitable wavelength, typically from about 190 to about 425 nanometers, although the wavelength can be outside this range. The reverse photochromic effect can be induced by irradiation with visible light, typically in the wavelength range of from about 425 to about 700 nanometers, although the wavelength can be outside this range, or by the application of heat.

The marking particles of the present invention can be used to print unnoticeable images on substrates such as paper or the like, such as logos, text, watermarks, or other markers. When the imaged substrate is exposed to light at from about 190 to about 425 nanometers, however, the spiropyran immediately undergoes a ring-opening to a strongly fluorescent red colored merocyanine form. In one embodiment, the marking particles of the present invention can be used to print an unnoticeable or unobtrusive mark superimposed with another clearly visible image such as a logo or text; the mark does not impair the readability of the logo or text image when the material is in the spiropyran form. Upon attempting to copy or scan the superimposed images, however, the light radiation from the copier or scanner convert the mark in the spiropyran form to the merocyanine form. The marks in the merocyanine form then appear as solid patches, thus rendering the superimposed logo or text image uncopyable.

The marking particles of the present invention can also be used to print embedded data. For example, by introducing into a color xerographic imaging machine containing the typical four toner cartridges of cyan, magenta, yellow, and black a fifth cartridge containing, for example, a second yellow toner that also contains the spiropyran, special marks, such as bar codes (bar-like codes and methods and apparatus for coding and decoding information contained therein are disclosed in, for example, U.S. Pat. Nos. 4,692,603, 4,665,004, 4,728,984, 4,728,783, 4,754,127, and 4,782,221, the disclosures of each of which are totally incorporated herein by reference) or "glyphs" as disclosed in, for example, U.S. Pat. Nos. 5,710,420, 5,128,525, 5,291,243, 5,168,147, 5,091,966, 5,051,779, 5,337,361, European Patent Application 469,864-A2, and European Patent Application 459,792-A2, the disclosures of each of which are totally incorporated herein by reference, can be introduced unnoticed into graphics, text, or other images to embed extra or coded information that becomes detectable either by a special scanner that interprets the information and translates it into human readable terms, or with ultraviolet light.

The marking particles of the present invention can also be used to generate electronically addressable displays. For example, marking particles according to the present invention are applied uniformly to a substrate such as paper and fused or otherwise permanently affixed thereto. The substrate has a blank appearance. An addressing wand is used to irradiate certain areas of the substrate with radiation, such as UV light, converting the irradiated areas from the colorless spiropyran form to the red merocyanine form, thereby causing the irradiated areas to appear red. For erasure of the markings, the entire substrate is irradiated with light of the appropriate wavelength for conversion of the red merocyanine form back to the colorless form. This embodiment constitutes a reflective, reimageable display. In another embodiment, the spiropyran is photochromically unstable over extended periods of time. Addressing of the substrate allows markings to remain visible only temporarily (for example, hours or days). Such temporary markings are useful in the protection of confidential information and in the area of secure documents.

The marking particles of the present invention can be applied to any desired substrate. Examples of suitable substrates include (but are not limited to) plain papers such as Xerox® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of Carboxylate and Sulfonate Substituted Spiropyran Salts

Step 1: Synthesis of 2,3,3-trimethylindolinium Salts

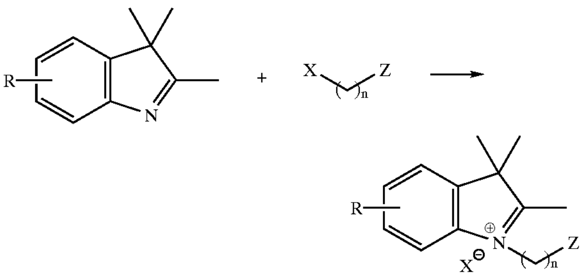

Because of the relatively weak nucleophilicity of 2,3,3-trimethylindolenine (where R is hydrogen) or its vinyl derivative 2,3,3,8-vinyl tryimethylindolenine (where R is vinyl), the syntheses of 2,3,3-trimethylindolinium salts were conducted either in the absence of any solvent or with a dipolar aprotic solvent (nitromethane) at 100° C.

Vinyl containing indolenine precursors can be prepared by Friedel-Crafts acylation of the precursors for the preparation of polymerizable spiropyrans. Alternatively, Friedel-Crafts acylation of the spiropyrans can be carried out. A general synthetic route to these materials is disclosed in, for example, G. K. Hamer, I. R. Peat, and W. F. Reynolds, "Investigations of Substituent Effects by Nuclear Magnetic Resonance Spectroscopy and All-Valence Electron Molecular Orbital Calculations. I. 4-Substituted Styrenes," *Can. J. Chem.,* Vol. 51, 897–914 (1973) and G. K. Hamer, I. R. Peat, and W. F. Reynolds, "Investigations of Substituent Effects by Nuclear Magnetic Resonance Spectroscopy and All-Valence Electron Molecular Orbital Calculations. II. 4-Substituted α-Methylstyrenes and α-t-Butylstyrenes," *Can. J. Chem.,* Vol. 51, 915–926 (1973), the disclosures of each of which are totally incorporated herein by reference, and is outlined below.

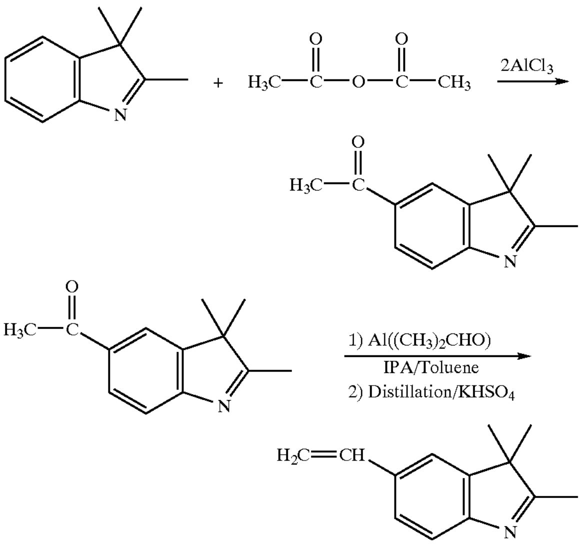

Alkylating agents that can be used in this reaction (all available from Aldrich Chemical Co., Milwaukee, Wis.) are 3-iodopropionic acid, ethyl 5-bromopentanoate, 6-bromohexanoic acid, 1,3-propylsulfone, and 1,4-butylsulfone. The choice of these reagents ensures that competing ring-formation and/or acid-base reactions are minimal to allow for nucleophilic attack of the sp2-N.

IA

Synthesis of N-(2-carboxyethyl)-2,3,3-trimethylindolinium Iodide

The general procedure for the preparation of the 2,3,3-trimethylindolinium salt intermediates is illustrated through the reaction of 2-iodopropionic acid and 2,3,3-trimethylindolenine. Vinyl containing intermediates can also be prepared from the N-(2-carboxyethyl)-2,3,3-trimethylindolinium iodide.

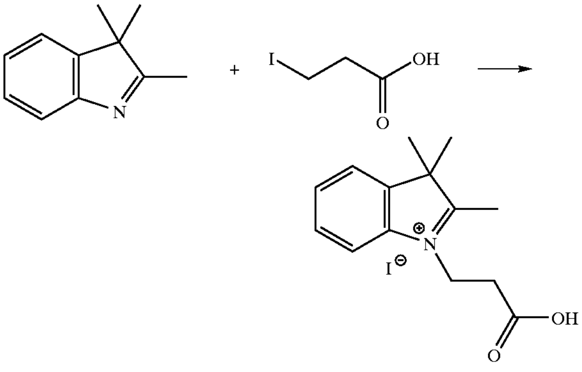

A 2-necked 50 milliliter round-bottomed flask equipped with a magnetic stirring bar and an argon inlet was charged with re-distilled (pressure 2 mm Hg, temperature 45° C.)

2,3,3-trimethylindolenine (7.95 grams, 50.0 mmol) and 3-iodopropionic acid (2.00 grams, 10 mmol). The mixture was heated to 80° C. for 12 hours, during which time the product precipitated out of solution and formed a highly viscous medium. Upon cooling, the reaction mixture was extracted three times with 200 milliliter portions of diethyl ether to remove all of the unreacted starting material. The remaining crystalline solid was then dissolved in 10 milliliters of water, extracted three times with 50 milliliter portions of diethyl ether, and extracted three times with 25 milliliter portions of $CHCl_3$. The aqueous layer was then removed and dried under vacuum (1.0 mm Hg) for 24 hours. The resulting amorphous solid was then recrystallized from toluene/$CHCl_3$ mixtures to produce the N-(2-carboxyethyl)-2,3,3-trimethylindolinium iodide product as 3.0 grams of a yellow solid (83.5 percent yield). $^1H$ and $^{13}C$ NMR spectra indicated the following:

$^1H$ NMR (400.1 MHz) in DMSO-$d_6$: δ7.97 (1 H, m), 7.83 (1H, m), 7.59 (2H, m), 4.64 (2H, t, J=6, N—$CH_2$), 2.97 (2H, t, J=6, $CH_2CO$), 2.86 (3H, S, $CH_3$), 1.52 (6H, s, $CH_3$).

$^{13}C$ NMR (100.1 MHz) in DMSO-$d_6$: 198.0, 171.6, 141.8, 140.7, 129.5, 129.1, 123.7, 115.7, 54.4, 43.9, 31.3, 22.1, 15.0.

IB

Synthesis of N-(ethylpentanoyl)-2,3,3-trimethylindolinium Bromide

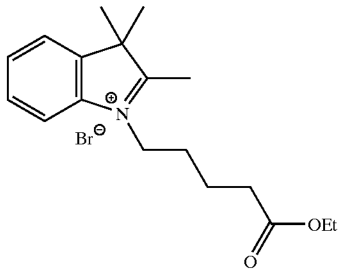

N-(ethylpentanoyl)-2,3,3-trimethylindolinium bromide was prepared by the process set forth in Example IA with 2,3,3-trimethylindolenine and ethyl 5-bromopentanoate to produce 2.65 grams (78 percent yield) of reddish-yellow crystals. $^1H$ and $^{13}C$ NMR spectra indicated the following:

$^1H$ NMR (400.1 MHz) in DMSO-$d_6$: δ8.02 (1H, m), 7.83 (1H, m), 7.61 (2H, m), 4.48 (2H, t, J=6, N—$CH_2$), 4.01 (2H, t, J=7, O—$CH_2$), 2.84 (3H, s, $CH_3$), 2.40 (2H, t, J=7, $CH_2CO$), 2.08 (4H, m, —$CH_2$), 1.53 (6H, s, $CH_3$), 1.13 (3H, t, J=7 Hz).

$^{13}C$ NMR (100.1 MHz) in DMSO-$d_6$: 197.0, 173.8, 172.3, 141.9, 141.2, 129.4, 128.9, 123.6, 115.3, 60.2, 54.3, 46.9, 30.3, 22.4, 22.0, 14.1.

IC

Synthesis of N-(5-carboxypentyl)-2,3,3-trimethylindolinium Bromide

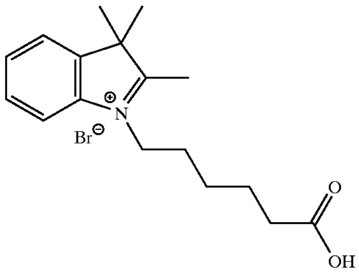

N-(5-carboxypentyl)-2,3,3-trimethylindolinium bromide was prepared by the process set forth in Example IA with 2,3,3-trimethylindolenine and 6-bromohexanoic acid to produce 2.43 grams (71.2 percent yield) of yellow crystals. $^1H$ and $^{13}C$ NMR spectra indicated the following:

$^1H$ NMR (400.1 MHz) in DMSO-$d_6$: δ7.98 (1 H, m), 7.86 (1 H, m), 7.60 (2H, m), 4.46 (2H, t, J=6, N—$CH_2$), 2.85 (3H, s, $CH_3$), 2.21 (2H, t, J=7, $CH_2CO$), 1.83 (2H, m, —$CH_2$), 1.52 (6H, s, $CH_3$), 1.46 (4H, s, —$CH_2$—).

$^{13}C$ NMR (100.1 MHz) in DMSO-$d_6$: 196.9, 174.7, 142.3, 141.5, 129.6, 129.4, 123.9, 115.9, 54.6, 47.9, 33.8, 27.4, 25.8, 24.5, 22.4, 14.6.

ID

Synthesis of 2,3,3-trimethylindolinium-N-propylsulfonate

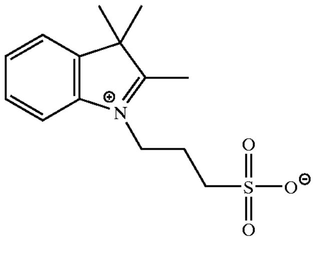

2,3,3-trimethylindolinium-N-propylsulfonate was prepared by the process set forth in Example IA with 2,3,3-trimethylindolenine and 1,3-propylsultone to produce 2.98 grams (94 percent yield) of white crystals. $^1H$ and $^{13}C$ NMR spectra indicated the following:

$^1H$ NMR (400.1 MHz) in DMSO-$d_6$: δ7.99 (1H, m), 7.77 (1H, m), 7.55 (2H, m), 4.60 (2H, t, J=7, N—$CH_2$), 2.78 (3H, s, $CH_3$), 2.61 (2H, t, J=7, $CH_2SO_3^-$), 2.11 (2H, m, —$CH_2$—), 1.47 (6H, s, $CH_3$).

$^{13}C$ NMR (100.1 MHz) in DMSO-$d_6$: 196.9, 142.2, 141.5, 129.6, 129.2, 123.7, 115.7, 54.4, 47.7, 46.9, 24.0, 22.3, 14.1.

IE

Synthesis of 2,3,3-trimethylindolinium-N-butylsulfonate

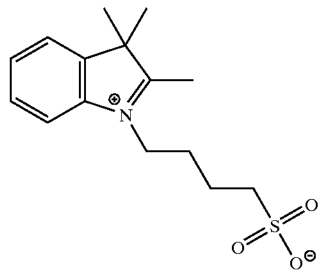

2,3,3-trimethylindolinium-N-butylsulfonate was prepared by the process set forth in Example IA with 2,3,3-trimethylindolenine and 1,4-butylsulfone to produce 2.86 grams (89.2 percent yield) of white crystals. $^{1}H$ and $^{13}C$ NMR spectra indicated the following:

$^{1}H$ NMR (400.1 MHz) in DMSO-$d_6$: δ8.03 (1H, m), 7.82 (1H, m), 7.60 (2H, m), 4.48 (2H, t, J=7, N—$CH_2$), 2.85 (3H, s, $CH_3$), 2.49 (2H, m, $CH_2SO_3^-$), 1.97 (2H, m, —$CH_2$—), 1.76 (2H, m, —$CH_2$—) 1.53 (6H, s, $CH_3$).

$^{13}C$ NMR (100.1 MHz) in DMSO-$d_6$: 196.9, 142.2, 141.5, 129.6, 129.2, 123.7, 115.7, 54.4, 47.7, 46.9, 24.0, 22.8, 22.3, 14.1.

EXAMPLE II

Preparation of Carboxylate Substituted Spiropyran Salts

Step 2: Synthesis of 6-nitro-benzoindolino Spiropyrans (BIPS)

In the presence of a base, the functionalized salts were converted to an activated Fischer Base capable of undergoing a condensation reaction with 5-nitrosalicaldehyde. The solvent used in this reaction was ethanol, since the majority of spiropyrans are only partially soluble in this medium.

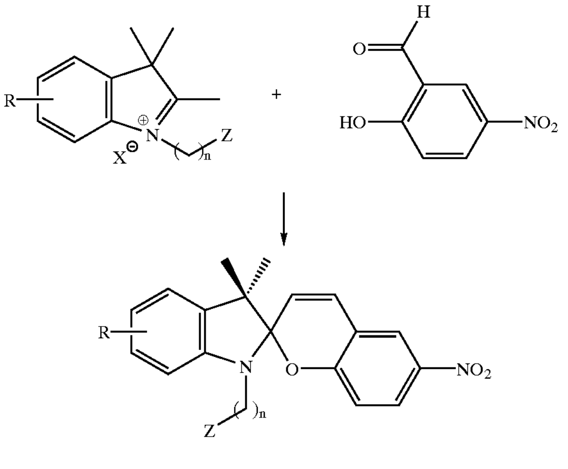

IIA

Synthesis of 6-Nitro-N-2-carboxyethyl) spirobenzoindolinopyran

The general procedure for the preparation of the spiropyrans is illustrated through the condensation of 2-carboxyethyl-2,3,3-trimethylindolinium iodide with 5-nitrosalicaldehyde in the presence of a base, triethylamine.

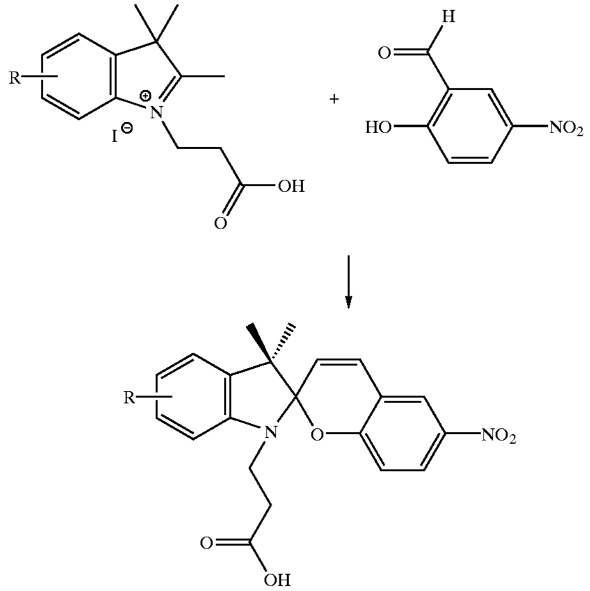

Into a 50 milliliter round-bottomed flask equipped with a water condenser topped with a pressure-equalized dropping funnel was added 2-carboxyethyl-2,3,3-trimethylindolinium iodide (prepared as described in Example IA; 1.0 gram, 2.78 mmol) and 5-nitrosalicaldehyde (0.50 gram, 3.0 mmol). Ethanol was added until the solids dissolved at reflux temperature, followed by addition of triethylamine (0.280 gram, 2.78 mmol) in 5 milliliters of ethanol via the dropping funnel over 20 minutes. Addition of the base resulted in an immediate color change to purple, signifying that spiropyran formation was occurring. The mixture was refluxed for 6 hours and then cooled to room temperature. The volume was concentrated to 5 milliliters before cooling the flask to 0° C. in a refrigerator for 24 hours. The spiropyran precipitate was filtered under vacuum and recrystallized from ethanol to give yellow crystals of 6-nitro-N-(2-carboxyethyl) spirobenzoindolinopyran, yield 0.763 grams (72.2 percent), melting point 192–194° C. $^{1}H$ NMR, $^{13}C$ NMR, IR, and UV-visible spectra indicated the following:

$^{1}H$ NMR (400.1 MHz) in DMSO-$d_6$: δ8.21 (1H, d, J=3), 8.00 (1H, d, J=9), 7.21 (1H, d, J=10.5), 7.11 (2H, m), 6.87 (2H, m), 6.67 (1H, d, J=7.8), 6.00 (1H, d, J=10.5), 3.42 (2H, J=6, N—$CH_2$), 2.50 (2H, t, J=6, $CH_2CO$), 1.18 (3H, s, $CH_3$), 1.07 (3H, s, $CH_3$).

$^{13}C$ NMR (100.1 MHz) in DMSO-$d_6$: 173.7, 159.9, 146.9, 141.3, 136.5, 129.0, 128.5, 126.5, 123.6, 122.6, 120.1, 119.7, 116.3, 107.5, 107.3, 53.5, 34.0, 26.4, 20.3.

IR (KBr, $cm^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}$ (ε)): 336 nm, 9,600 $M^{-1}$ $cm^{-1}$.

Elemental analysis: Calculated for $C_{21}H_{20}O_5N_2$: C, 65.30; H, 5.26; N, 7.30.

Found: C, 64.96; H, 5.23; N, 7.22.

IIB

Synthesis of 6-Nitro-(N-ethylpentanoyl) spirobenzoindolinopyran

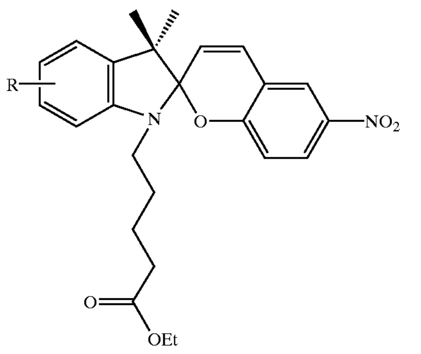

6-Nitro-(N-ethylpentanoyl)spirobenzoindolinopyran was prepared by the process set forth in Example IIA with 5-nitrosalicaldehyde and N-(ethylpentanoyl)-2,3,3-trimethylindolinium bromide (prepared as described in Example IB). $^{1}H$ NMR spectra indicated the following:

$^{1}H$ NMR (400.1 MHz) in $CDC_3$: δ7.99 (2H, m), 7.15 (1H, t), 7.06 (1H, d), 6.86 (2H, t), 6.72 (1H, d), 6.60 (1H, t), 5.85 (1H, d), 4.08 (2H, q, O—$CH_2$), 3.17 (2H, t), 2.39 (2H, $CH_2CO$), 2.00 (4H, m, —$CH_2$), 1.22 (9H, m, $CH_3$).

Deprotection of the Chelating Functionality

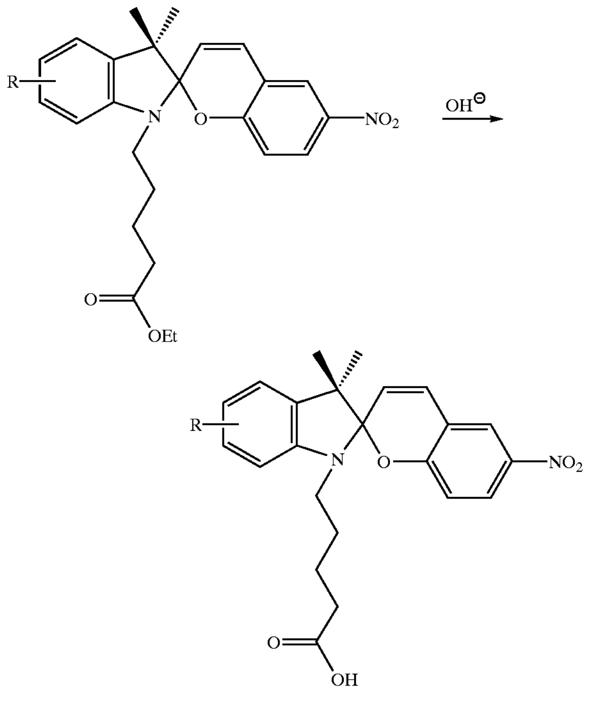

To a 50 milliliter round-bottomed flask equipped with a magnetic stir bar and an argon inlet was added finely ground 6-nitro-(N-ethylpentanoate)spirobenzoindolinopyran (1.0 gram, 2.28 15 mmol) and dissolved in 10 milliliters of THF. Sodium hydroxide (25 milliliters of a 1 Molar solution) was added to the solution and stirred for 24 hours before rotary evaporation at room temperature under high vacuum. The solids were dissolved in a minimum amount of water and the product was precipitated through neutralization with 1 Molar hydrochloric acid. Vacuum filtration isolated the solid, which was recrystallized from ethanol to yield 0.962 gram of yellow-red crystals of 6-nitro-(N-4-carboxylbutyl) spirobenzoindolinopyran (94 percent yield), melting point 139–141° C. $^{1}H$ NMR, $^{13}C$ NMR, IR, and UV-visible spectra indicated the following:

$^{1}H$ NMR (400.1 MHz) in DMSO-$d_6$: δ8.19 (1H, d, J=2.8), 7.97 (1H, d, J=9.0), 7.19 (1H, d, J=10.4), 7.08 (2H, m), 6.84 (1H, d, J=7.2), 6.76 (1H, t, J=7.2), 6.57 (1H, d, J=7.8), 5.98 (1H, d, J=10.4), 3.10 (2H, m, N—$CH_2$), 2.16 (2H, t, J=6.8, $CH_2CO$), 1.55 (4H, m, —$CH_2$—), 1.18 (3H, s, $CH_3$), 1.09 (3H, s, $CH_3$).

$^{13}C$ NMR: 174.4, 159.2, 146.7, 140.4, 135.6, 128.1, 127.6, 125.7, 122.8, 121.6, 118.9, 118.7, 115.4, 106.4, 52.2, 33.5, 28.0, 26.1, 24.2, 19.5.

IR ($cm^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}$ (ε)): 338 nm, 7,800 $M^{-1}$ $cm^{-1}$.

Elemental analysis: Calculated for $C_{23}H_{24}O_5N_2$: C, 67.61; H, 5.89; N, 6.82.

Found: C, 67.31; H, 5.92; N, 6.60.

IIC

Synthesis of 6-nitro-N-(5-carboxypentyl) spirobenzoindolinopyran

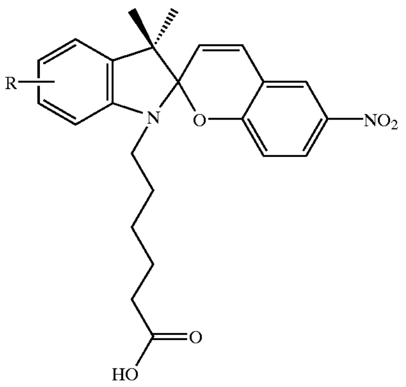

6-nitro-N-(5-carboxypentyl)spirobenzoindolinopyran was prepared by the process set forth in Example IIA with 5-nitrosalicaldehyde and N-(5-carboxypentyl)-2,3,3-trimethylindolinium bromide (prepared as described in Example IC) to produce 1.23 grams (48 percent yield) of yellow-red crystals, melting point 80–82° C. $^{1}H$ NMR, $^{13}C$ NMR, IR, and UV-visible spectra indicated the following:

$^{1}H$ NMR (400.1 MHz) in DMSO-$d_6$: δ8.19 (1H, d, J=3.2), 8.00 (1H, d, J=9.0), 7.21 (1H, d, J=10.5), 7.08 (2H, m), 6.80 (2H, m), 6.57 (1H, d, J=5.98 (1H, d, J=10.5), 3.10 (2H, m, N—$CH_2$), 2.13 (2H, m, $CH_2CO$), 1.45 (4H, m, —$CH_2$—), 1.20 (2H, m, —$CH_2$—), 1.18 (3H, s, $CH_3$), 1.07 (3H, s, $CH_3$).

$^{13}C$ NMR: 174.4, 159.2, 146.7, 140.4, 135.6, 128.1, 127.6, 125.7, 122.8, 121.6, 118.9, 118.7, 115.4, 106.4, 52.2, 33.5, 28.0, 26.1, 25.8, 24.2, 19.5.

IR ($cm^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}$ (ε)): 342 nm, 8,400 $M^{-1}$ $cm^{-1}$.

Elemental analysis: Calculated for $C_{24}H_{25}O_5N_2$: C, 68.20; H, 6.16; N, 6.70.

Found: C, 68.30; H, 6.09; N, 6.52.

Step 3: Preparation of Carboxylate Salts

Preparation of the carboxylate salts entailed the treatment of an alcoholic solution of the spiropyran with about 1 molar equivalent of NaOEt or KOEt. A representative procedure is described through the reaction of 6-nitro-(N-carboxyethyl) spirobenzoindolinopyran with NaOEt:

IID

Synthesis of 6-Nitro-spirobenzoindolinopyran-N-ethylsodiumcarboxylate

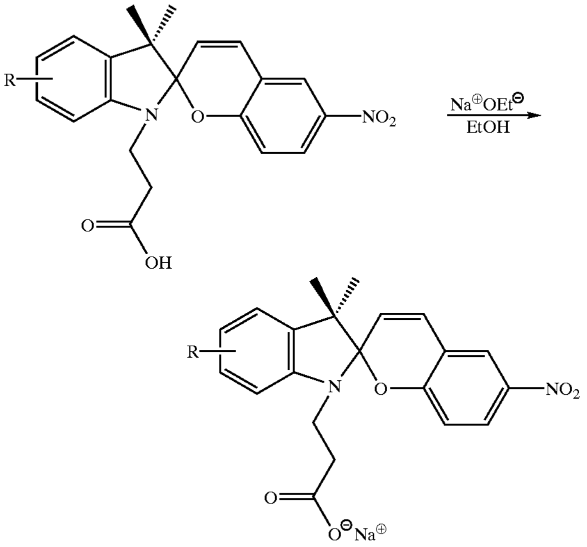

In a 50 milliliter round-bottomed flask equipped with a magnetic stir bar and an argon inlet was added finely ground 6-nitro-(N-carboxyethyl)spirobenzoindolinopyran (0.100 gram, 0.263 mmol) prepared as described in Example IIA and dissolved in 5 milliliters of ethanol. The mixture was then cooled to 0° C. in an ice bath before adding through a syringe 3.0 milliliters of an 8.64x$10^{-2}$ Molar NaOEt (0.265 mmol) solution. The reaction was stirred for 3 hours before rotary evaporation at room temperature under high vacuum. Recrystallization from ethanol gave 100 milligrams of yellow-red crystals of 6-nitro-spirobenzoindolinopyran-N-ethylsodiumcarboxylate (94.6 percent yield), melting point 202–204° C. $^{1}$H NMR, $^{13}$C NMR, IR, and UV-visible spectra indicated the following:

$^{1}$H NMR (400.1 MHz) in DMSO-$d_6$: δ8.17 (1H, d, J=2.8), 7.96 (1H, d, J=9.0), 7.15 (1H, d, J=10.5), 7.07 (2H, m), 6.83 (1H, d, J=9), 6.73 (1H, t, J=7.3), 6.58 (1H, d, J=8.0), 5.98 (1H, d, J=10.5), 3.23 (2H, m, N—$CH_2$), 2.19 (2H, m, $CH_2$CO), 1.16 (3H, s, $CH_3$), 1.05 (3H, s, $CH_3$).

$^{13}$C NMR: 173.3, 159.2, 146.5, 140.3, 135.5, 127.7, 127.5, 125.5, 122.6, 122.0, 121.4, 118.8, 118.6, 115.3, 106.5, 106.4, 52.2, 36.2, 25.7, 19.5.

IR ($cm^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$ (ε): 338 nm, 8,400 $M^{-1}$ $cm^{-1}$.

Elemental analysis (High resolution mass spectrometer (HRMS), fast atom bombardment with positive ions (FAB+)): Calculated for $C_{21}H_{21}O_5N_2$: 381.1451.

Found: 381.1399.

IIE

Synthesis of 6-Nitrospirobenzoindolinopyran-N-butylpotassiumcarboxylate

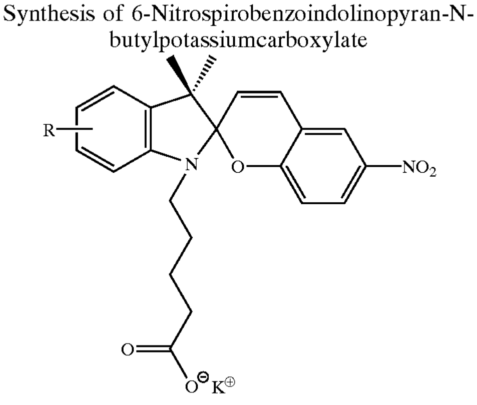

6-Nitrospirobenzoindolinopyran-N-butylpotassium carboxylate was prepared by the process set forth in Example IID with 6-nitro-(N-ethylpentanoyl) spirobenzoindolinopyran (prepared as described in Example IIB) to produce 0.94 gram of red crystals (94 percent yield), melting point 180–182° C. $^{1}$H NMR, $^{13}$C NMR, IR, and UV-visible spectra indicated the following:

$^{1}$H NMR (400.1 MHz) in DMSO-$d_6$: δ8.18 (1H, d, J=2.6), 7.97 (1H, d, J=9.0), 7.18 (1H, d, J=10.5), 7.10 (2H, m), 6.85 (1 H, d, J=9), 6.74 (1H, d, J=7.3), 6.57 (1H, d, J=7.8), 5.98 (1H, d, J=10.5), 3.49 (1H, m, N—CH), 3.05 (1H, m, N—CH), 1.81 (2H, m, $CH_2$CO), 1.32 (2H, m, —$CH_2$—), 1.20 (2H, m, —$CH_2$—), 1.1 (3H, s, $CH_3$), 1.07 (3H, s, $CH_3$).

$^{13}$C NMR: 174.4, 159.2, 146.7, 140.4, 135.6, 128.1, 127.6, 125.7, 122.8, 121.6, 118.9, 118.7, 115.4, 106.6, 106.4, 52.2, 42.7, 28.0, 26.1, 25.8, 19.5.

IR ($cm^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$ (ε)): 342 nm, 8,400 $M^{-1}$ $cm^{-1}$.

Elemental analysis (HRMS (FAB+)): Calculated for $C_{23}H_{24}O_5N_2K$: 447.2677

Found: 447.2688.

IIF

Synthesis of 6-Nitrospirobenzoindolinopyran-N-pentylpotassium Carboxylate

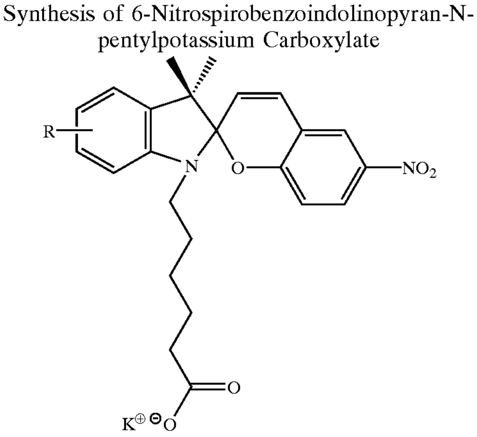

6-Nitrospirobenzoindolinopyran-N-pentylpotassium carboxylate was prepared by the process set forth in Example IID with 6-nitro-N-(5-carboxypentyl) spirobenzoindolinopyron (prepared as described in Example IIC) to produce 0.54 grams (73 percent yield) of dark red 6-nitrospirobenzoindolinopyran-N-pentylpotassium carboxylate crystals, melting point 100–102° C. $^{1}H$ NMR, $^{13}C$ NMR, IR, and UV-visible spectra indicated the following:

$^{1}H$ NMR (400.1 MHz) in DMSO-$d_6$: δ8.17 (1 H, d, J=2.8), 7.97 (1H, k, d, J=9.0), 7.18 (1H, d, J=10.5), 6.84 (2H, m), 6.84 (1H, d, J=9), 6.77 (1H, t, J=7.6), 6.55 (1H, d, J=7.8), 5.98 (1H, d, J=10.5), 3.10 (2H, m, N—$CH_2$), 1.79 (2H, m, $CH_2CO$), 1.45 (4H, m, —$CH_2$—), 1.20 (2H, m, —$CH_2$—), 1.18 (3H, s, $CH_3$), 1.05 (3H, s, $CH_3$).

$^{13}C$ NMR: 174.4, 159.2, 146.7, 140.4, 135.6, 128.1, 127.6, 125.7, 125.2, 122.8, 121.8, 118.8, 118.7, 115.4, 106.4, 52.2, 43.0, 33.5, 28.0, 26.1, 25.8, 24.2, 19.5, 14.1.

IR ($cm^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$ (ε): 342 nm, 8,400 $M^{-1}$ $cm^{-1}$.

Elemental analysis (HRMS (FAB+)): Calculated for $C_{24}H_{25}O_5N_2K$: 461.2424.

Found: 461.2445.

EXAMPLE III

Preparation of Sulfonate Substituted Spiropyran Salts

Step 2: Synthesis of 6-nitro-benzoindolino Spiropyrans (BIPS)

IIIA

Synthesis of 6-Nitro-spirobenzoindolinopyran-N-propyl-triethylammoniumsulfonate

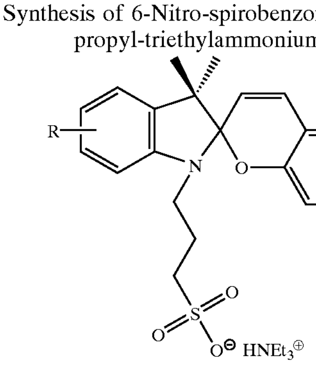

6-Nitro-spirobenzoindolinopyran-N-propyl-triethyl ammoniumsulfonate was prepared by the process set forth in Example IIA with 5-nitrosalicaldehyde and 2,3,3-trimethylindolinium-N-propylsulfonate (prepared as described in Example ID). The product was recrystallized from ethyl acetate to produce 1.43 grams (52 percent yield) of yellow crystals, melting point 188–190° C. $^{1}H$ NMR, $^{13}C$ NMR, IR, and UV-visible spectra indicated the following:

$^{1}H$ NMR (400.1 MHz) in DMSO-$d_6$: δ8.27 (1H, d, J=2.8), 8.04 (1H, d, J=9.0), 7.26 (1H, d, J=10.4), 7.15 (2H, m), 6.83 (3H, m), 6.03 (1H, d, J=3.29 (2H, t, J=7.3, N—$CH_2$), 3.13 (6H, q, J=7.3, $CH_2CH_3$), 2.50 (2H, m, $CH_2SO_3$) 1.49 (2H, m, —$CH_2$—), 1.25 (9H, t, $CH_3$), 1.19 (3H, s, $CH_3$), 1.16 (3H, s, $CH_3$).

$^{13}C$ NMR: 159.2, 146.7, 140.4, 135.5, 128.1, 127.6, 125.7, 122.8, 121.6, 121.5, 118.9, 118.7, 115.4, 106.4, 106.4, 52.2, 49.0, 45.7, 42.2, 24.7, 19.5, 8.55.

IR ($cm^{-1}$): 3020, 2970, 2684, 2510, 1652, 1607, 1510, 1483, 1457, 1333, 1275, 1218, 1156, 1123, 1089, 1020, 916, 805.

UV-Visible (DMSO, $\lambda_{max}$ (ε)): 342 nm, 8,600 $M^{-1}$ $cm^{-1}$.

Elemental analysis: Calculated for $C_{27}H_{37}O_6N_3S$: C, 61.05; H, 6.70; N, 7.90; S, 5.94.

Found: C, 61.30; H, 6.67; N, 7.83; S, 5.86.

IIIB

Synthesis of 6-Nitro-spirobenzoindolinopyran-N-butyl-triethylammoniumsulfonate

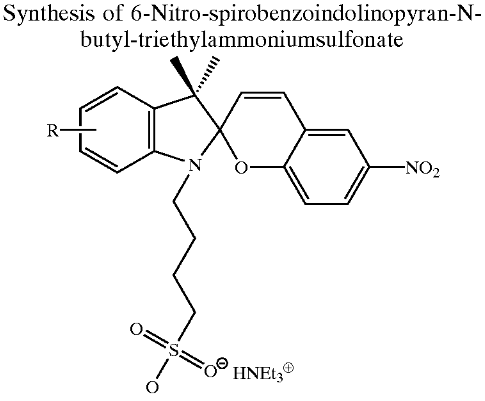

6-nitro-spirobenzoindolinopyran-N-butyl-triethylammonium sulfonate was prepared by the process set forth in Example IIA with 5-nitrosalicaldehyde and 2,3,3-trimethylindolinium-N-butylsulfonate (prepared as described in Example IE). The product was recrystallized from ethyl acetate to produce 0.86 gram (36 percent yield) of purple crystals, melting point 208–210° C. $^{1}H$ NMR, $^{13}C$ NMR, IR, and UV-visible spectra indicated the following:

$^{1}H$ NMR (400.1 MHz) in DMSO-$d_6$: δ8.27 (1H, d, J=2.8), 8.04 (1H, d, J=9.0), 7.26 (1H, d, J=10.4), 7.15 (2H, m), 6.83 (3H, m), 6.03 (1H, d, J=10.4), 3.29 (2H, t, J=7.3, N—$CH_2$), 3.13 (6H, q, J=7.3, $CH_2CH_3$), 2.50 (2H, m $CH_2SO_3$) 1.49 (4H, m, —$CH_2$—), 1.25 (9H, t, $CH_3$), 1.19 (3H, s, $CH_3$), 1.16 (3H, s, $CH_3$).

$^{13}C$ NMR: 159.2, 146.7, 140.4, 135.6, 128.1, 127.6, 125.7, 122.8, 121.6, 118.9, 118.7, 115.4, 106.4, 59.7, 52.2, 42.5, 33.3, 28.0, 25.8, 24.2, 22.1, 19.5, 14.0.

IR ($cm^{-1}$): 3020, 2970, 2684, 2510, 1652, 1607, 1510, 1483, 1457, 1333, 1275, 1218, 1156, 1123, 1089, 1020, 916, 805.

UV-Visible (DMSO, $\lambda_{max}$ (ε)): 344 nm, 9,000 $M^{-1}$ $cm^{-1}$.

Elemental analysis: Calculated for $C_{28}H_{39}O_6N_3S$: C, 59.70; H, 6.90; N, 7.52; S, 5.70.

Found: C, 59.64: H, 6.84; N, 7.43; S, 5.62.

EXAMPLE IV

Into a solution containing 576 grams of n-lauryl methacrylate, 226 grams of 2,4-toluene diisocyanate, 4 grams of the spiropyran photochromic dye 6-nitro-spirobenzoindolinopyran-N-ethylsodiumcarboxylate prepared in Example IID, and 11 grams of calcium chloride (molar ratio of 10 moles calcium chloride per one mole of spiropyran) are dissolved 20 grams of the monomer soluble initiator Vazo 67 (available from E. I. DuPont de Nemours & Co., Wilmington, Del.). The resulting solution is then mixed at 10,000 rpm with a polytron mixer. Thereafter, 5 liters of a solution containing 1 percent by weight polyvinylalcohol in distilled deionized water is added to the monomer/spiropyran/initiator solution and the resultant mixture is mixed with the polytron mixer to produce a suspension of oil droplet particles in the size range of 5 to 25 microns in average particle diameter. This suspension is transferred to a polymerization vessel, to which an aqueous solution containing 150 grams of diethylenetriamine in 1,000 grams of water is added quickly at room temperature to the mixture, causing an immediate interfacial polymerization between the amine and the isocyanate comonomers, forming a hard urea shell around the core comprising monomer, spiropyran, and initiator. Thereafter, the N-lauryl methacrylate monomers in the core are polymerized by first heating the mixture containing the urea spheres encapsulating the spiropyran dye, initiator, and n-lauryl methacrylate to 75° C. for 3 hours. To achieve efficient photoinduced switching of the dye from the spiropyran form (irradiation at $\lambda_{max}$=536–572 nm) to the merocyanine form (irradiation at $\lambda_{max}$=330–350 nm) (i.e., more than about 90 percent conversion upon exposure) and useful bi-stable states (half lives greater than about 120 seconds before conversion back to original state), the molecular weight of the polymerized core material is maintained at a value below 30,000 Daltons by strict control of initiator to monomer ratio and polymerization temperature. The resulting marking particles are then recovered, washed to remove residual polyvinylalcohol, and freeze dried.

EXAMPLE V

Into a solution containing 576 grams of n-lauryl methacrylate, 226 grams of 2,4-toluene diisocyanate, 4 grams of the sulfonated spiropyran photochromic dye 6-nitro-spirobenzoindolinopyran-N-propyl-triethyl ammonium sulfonate prepared in Example IIIA, and 10.9 grams of zinc chloride are dissolved 20 grams of the monomer soluble initiator Vazo 67 (available from E. I. DuPont de Nemours & Company, Wilmington, Del.). The solution is then mixed at 10,000 rpm with a polytron mixer. Thereafter, 5 liters of a solution containing 1 percent by weight polyvinylalcohol in distilled deionized water is added to the monomer/spiropyran/initiator solution and the resultant mixture is mixed with the polytron mixer to produce a suspension of oil droplet particles in the size range of 5 to 20 microns in average particle diameter. This suspension is transferred to a polymerization vessel, to which an aqueous solution containing 150 grams of diethylenetriamine in 1,000 grams of water is added quickly at room temperature to the mixture, causing an immediate interfacial polymerization between the amine and the isocyanate comonomers, forming a hard urea shell around the core comprising the monomer, spiropyran, and initiator. Thereafter, the N-lauryl methacrylate monomer in the core is polymerized by first heating the mixture containing the urea spheres encapsulating the spiropyran dye, initiator, and n-lauryl methacrylate to 75° C. for 3 hours. The molecular weight of the polymerized core monomers is maintained at a value below 30,000 Daltons by strict control of initiator to monomer ratio and polymerization temperature. The resulting marking particles are then recovered, washed to remove residual polyvinylalcohol, and freeze-dried.

EXAMPLE VI

Into a solution containing 576 grams of n-lauryl methacrylate, 226 grams of 2,4-toluene diisocyanate, 4 grams of the sulfonated spiropyran photochromic dye 6-nitro-spirobenzoindolinopyran-N-propyl-triethyl ammonium sulfonate prepared in Example IIIA, and 5.5 grams of zinc chloride is dissolved 20 grams of the monomer soluble initiator Vazo 67 (available from E. I. DuPont de Nemours & Company, Wilmington, Del.). The solution is then mixed at 10,000 rpm with a polytron mixer. Thereafter, 5 liters of a solution containing 1 percent by weight polyvinylalcohol in distilled deionized water is added to the monomer/spiropyran/initiator solution and the resultant mixture is mixed with the polytron mixer to produce a suspension of oil droplet particles in the size range of 5 to 25 microns in average particle diameter. This suspension is transferred to a polymerization vessel, to which an aqueous solution containing 150 grams of diethylenetriamine in 1,000 grams of water is added quickly at room temperature to the mixture, causing an immediate interfacial polymerization between the amine and the isocyanate comonomers, forming a hard urea shell around the core. Thereafter, the N-lauryl methacrylate monomer in the core is polymerized by first heating the mixture containing the urea spheres encapsulating the spiropyran dye, initiator, and n-lauryl methacrylate to 75° C. for 3 hours. The molecular weight of the polymerized core monomer is maintained at a value below 30,000 Daltons by strict control of initiator to monomer ratio and polymerization temperature. The resulting marking particles are then recovered, washed to remove residual polyvinylalcohol, and freeze-dried.

EXAMPLE VII

Into a solution containing 576 grams of n-lauryl methacrylate, 226 grams of 2,4-toluene diisocyanate, 4 grams of the sulfonated spiropyran photochromic dye 6-nitro-spirobenzoindolinopyran-N-propyl-triethyl ammonium sulfonate prepared in Example IIIA, and 8.9 grams of calcium chloride is dissolved 20 grams of the monomer soluble initiator Vazo 67 (available from E. I. DuPont de Nemours & Company, Wilmington, Del.). The solution is then mixed at 10,000 rpm with a polytron mixer. Thereafter, 5 liters of a solution containing 1 percent by weight polyvinylalcohol in distilled deionized water is added to the monomer solution and the resultant mixture is mixed with the polytron mixer to produce a suspension of oil droplet particles in the size range of 5 to 20 microns in average particle diameter. This suspension is transferred to a polymerization vessel, to which an aqueous solution containing 150 grams of diethylenetriamine in 1,000 grams of water is added quickly at room temperature to the mixture, causing an immediate interfacial polymerization between the amine and the isocyanate comonomers, forming a hard urea shell around the core. Thereafter, the N-lauryl methacrylate monomer in the core is polymerized by first heating the mixture containing the urea spheres encapsulating the spiropyran dye, initiator, and n-lauryl methacrylate to 75° C. for 3 hours. The molecular weight of the polymerized core monomers is maintained at a value below 30,000 Daltons by strict control of initiator to monomer ratio and polymerization temperature. The resulting marking particles are then recovered, washed to remove residual polyvinylalcohol, and freeze-dried.

EXAMPLE VIII

Into a mixture of 760 milliliters of cyclohexane and 232 milliliters of dichloromethane are dissolved 127 grams of polyisobutylene, to which are added 114 grams of 2,4-toluene diisocyanate, 5 grams of a vinyl spiropyran photochromic dye of the formula

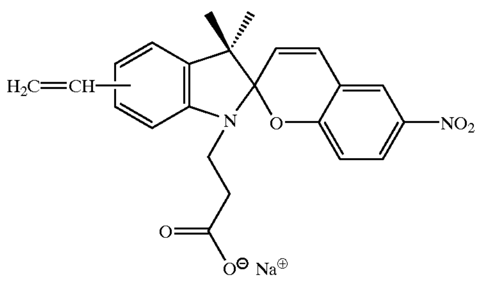

prepared by the process described in Example IIA, and 13 grams of calcium chloride. The resulting mixture is then homogenized with a polytron mixer at 10,000 rpm for 3 minutes. Thereafter, 4,120 milliliters of a solution containing 1 percent by weight polyvinylalcohol in water is added to the organic phase and the resulting mixture is homogenized at 10,000 rpm for 10 minutes. The resulting suspension is then transferred to a 2 gallon reactor. With agitation set at 200 rpm, 55.9 milliliters of diethylenetriamine in 200 milliliters of water is added to the suspension, which brings about an immediate interfacial polymerization. The resulting marking particles are then recovered, washed, and freeze-dried.

EXAMPLE IX

Into a mixture of 760 milliliters of cyclohexane and 232 milliliters of dichloromethane are dissolved 127 grams of polyisobutylene, to which are added 114 grams of 2,4-toluene diisocyanate, 5 grams of a vinyl sulfonated spiropyran photochromic dye of the formula

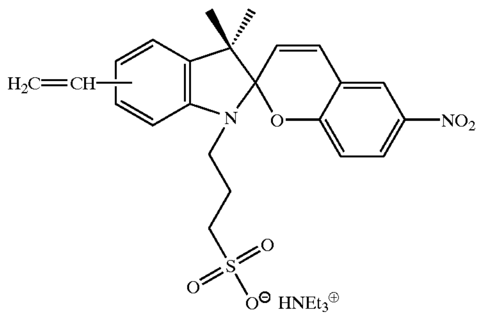

prepared by the process described in Example IIIA, and 13 grams of zinc chloride. The resulting mixture is then homogenized with a polytron mixer at 10,000 rpm for 3 minutes. Thereafter, 4,120 milliliters of a solution containing 1 percent by weight polyvinylalcohol in water is added to the organic phase and the resulting mixture is homogenized at 10,000 rpm for 10 minutes. The resulting suspension is then transferred to a 2 gallon reactor. With agitation set at 200 rpm, 55.9 milliliters of diethylenetriamine in 200 milliliters of water is added to the suspension, which brings about an immediate interfacial polymerization. The resulting marking particles are then recovered, washed, and freeze-dried.

EXAMPLE X

A developer composition is prepared by mixing 3 grams of the marking particles prepared in Example IV with 97 grams of a carrier comprising a ferrite core spray coated with a thin layer of a methyl terpolymer comprising 81 percent by weight methyl methacrylate, 14 percent by weight styrene, and 5 percent by weight vinyl triethoxysilane. The developer is then incorporated into an electrophotographic imaging device, followed by forming latent images, developing the latent images with the developer, transferring the developed images to substrates such as paper of transparency material, and fusing the developed images by application of heat, thereby forming substantially colorless images on the substrates.

Developers are prepared with the same carrier by the same method for the marking particles prepared in Examples V, VI, VII, VIII, and IX, and the developers are used to generate substantially colorless images by the same method.

EXAMPLE XI

The developed substantially colorless images formed in Example X are exposed to actinic radiation at wavelengths of from about 190 to about 425 nanometers, thereby causing the images to appear red. Subsequently, the red images are exposed to actinic radiation at wavelengths of from about 425 to about 700 nanometers, thereby causing the images to return to a substantially colorless appearance.

EXAMPLE XII

Marking particles prepared as described in Example IV are applied uniformly to a sheet of XEROX® 4024 plain paper and affixed thereto with heat and pressure by passing the paper through the fusing module of an electrophotographic imaging apparatus. The resulting addressable display is substantially colorless in appearance. Thereafter, an addressing wand is used to irradiate certain areas of the substrate with light at wavelengths of from about 190 to about 425 nanometers, converting the irradiated areas from the colorless spiropyran form to the red merocyanine form, thereby causing the irradiated areas to appear red. Subsequently, the red images are erased by irradiating the substrate with light at wavelengths of from about 425 to about 700 nanometers.

Similar addressable displays are prepared with the marking particles prepared as described in Examples V, VI, VII, VIII, and IX. It is believed that substantially similar results will be obtained.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An addressable display comprising a substrate having uniformly situated thereon a coating of marking particles comprising a first polymer, a second polymer, a chelating agent, and a spiropyran material of the formula

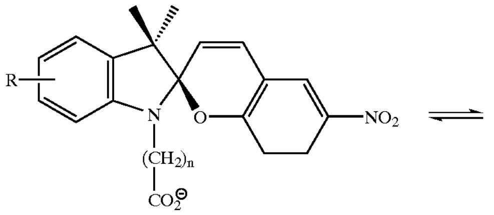

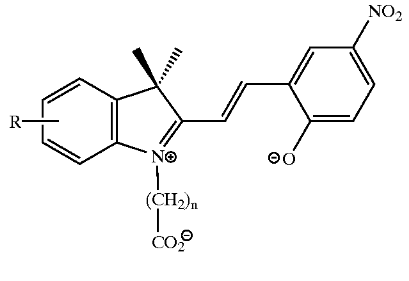

or

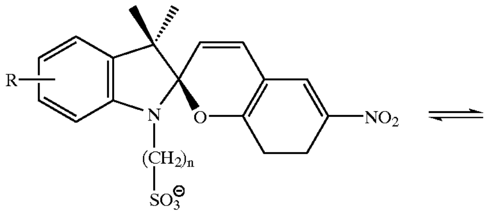

-continued

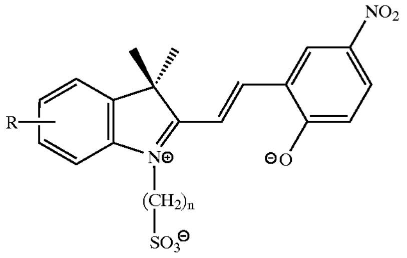

-continued

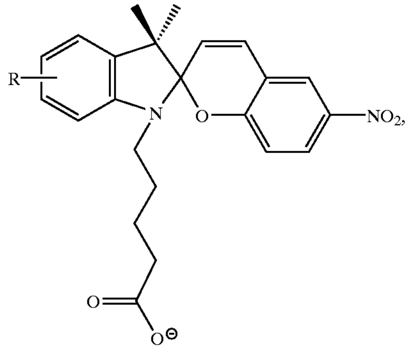

wherein n is an integer representing the number of repeat —$CH_2$— units and R is —H or —CH═$CH_2$, and wherein said particles comprise a core containing the first polymer in which is dispersed the chelating agent and the spiropyran and encapsulated within a shell of the second polymer formulated by an interfacial polymerization.

2. An addressable display according to claim 1 wherein the spiropyran material is of the formula

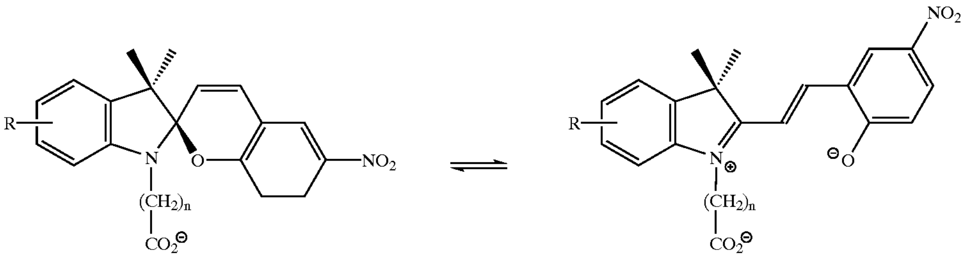

wherein n is an integer of from about 2 to about 8.

3. An addressable display according to claim 1 wherein the spiropyran material is of the formula

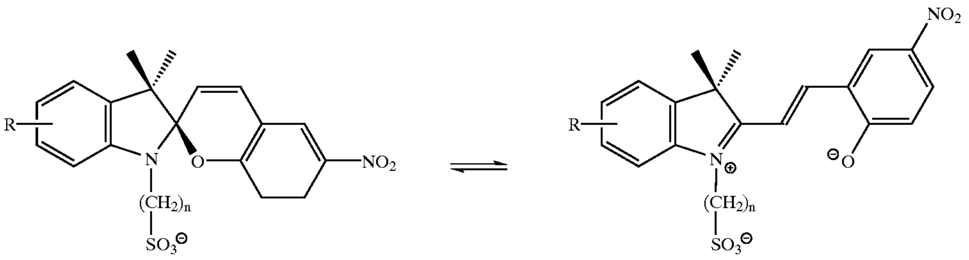

wherein n is an integer of from about 2 to about 8.

4. An addressable display according to claim 1 wherein the spiropyran material is of the formula

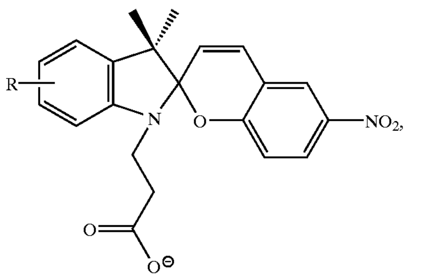

-continued

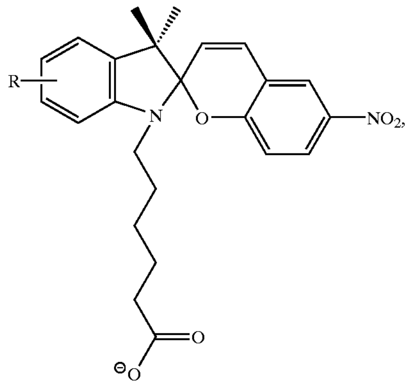

-continued

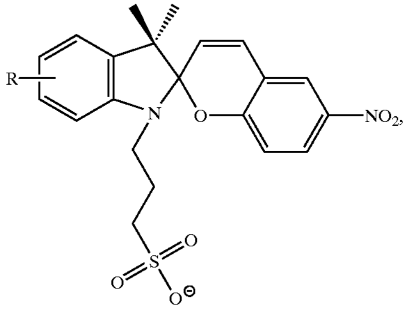

or

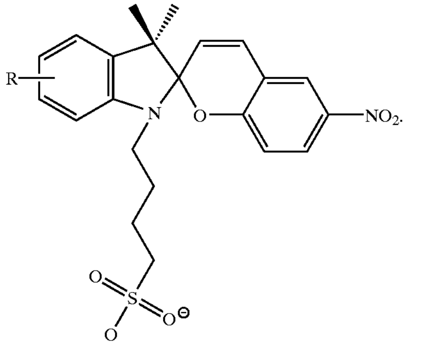

5. An addressable display according to claim 1 wherein the spiropyran material is present in the marking particles in an amount of at least about 0.01 percent by weight of the marking particles.

6. An addressable display according to claim 1 wherein the spiropyran material is present in the marking particles in an amount of at least about 0.05 percent by weight of the marking particles, and wherein the spiropyran material is present in the marking particles in an amount of no more than about 5 percent by weight of the marking particles.

7. An addressable display according to claim 1 wherein the chelating agent is a metal salt in the +2 state.

8. An addressable display according to claim 1 wherein the chelating agent is a salt of calcium, magnesium, zinc, or a transition metal.

9. An addressable display according to claim 1 wherein the chelating agent is present in the m marking particles in an amount relative to the spiropyran material of at least about 1 mole of chelating agent for every 1 mole of spiropyran material.

10. An addressable display according to claim 1 wherein the chelating agent is present in the marking particles in an amount relative to the spiropyran material of at least about 2 moles of chelating agent for every 1 mole of spiropyran material, and wherein the chelating agent is present in the marking particles in an amount relative to the spiropyran material of no more than about 10 moles of chelating agent for every 1 mole of spiropyran material.

11. An addressable display according to claim 1 wherein the spiropyran material is incorporated into the backbone of the first polymer or the second polymer.

12. An addressable display according to claim 1 wherein the first polymer is a polymer of monomers selected from styrene, α-methylstyrene, vinyl toluene, n-alkyl methacrylates, n-alkyl acrylates, branched alkyl methacrylates, branched alkyl acrylotes, chlorinated olefins, vinyl-phenolic materials, alkoxy alkoxy alkyl acrylates, alkoxy alkoxy alkyl methacrylates, cyano alkyl acrylates, cyano alkyl methacrylates, alkoxy alkyl acrylates, alkoxy alkyl methacrylates, methyl vinyl ether, maleic anhydride, butadiene, ethylene, vinylacetate, isobutylene, isoprene, or mixtures thereof.

13. An addressable display according to claim 1 wherein the core further comprises a wax.

14. An addressable display according to claim 13 wherein the wax is present in the marking particles in an amount of at least about 0.5 percent by weight of the core and wherein the wax is present in the marking particles in an amount of no more than about 20 percent by weight of the core.

15. An addressable display according to claim 13 wherein the wax is candelilla wax, bees wax, sugar cane wax, carnuba wax, paraffin wax, or mixtures thereof.

16. An addressable display according to claim 1 wherein the second polymer is prepared by interfacial polymerization of (a) an organic soluble shell monomer selected from sebacoyl chloride, terephthaloyl chloride, phthaloyl chloride, isophthaloyl chloride, azeloyl chloride, glutaryl chloride, adipoyl chloride, hexamethylene diisocyanate, 4,4'-dicyclohexylmethane diisocyanate, 2,4-toluene diisocyanate, 2,6-toluene diisocyanate, trans-1,4-cyclohexane diisocyanate, 4,4'-methyldiphenyl diisocyanate, 1,3,5-benzenetricarboxylic acid chloride, 4,4'-methyidiphenyl diisocyanate, tris(isocyanatophenyl) thiophosphate, or mixtures thereof, and (b) an aqueous soluble monomer selected from 1,6-hexanediamine, 1,4-bis (3-aminopropyl)piperazine, 2-methylpiperazine, m-xylene-αα'-diamine, 1,8-diamino-ρ-menthane, 3,3'-diamino-N-methyidipropylamine, 1,3-cyclohexanebis(methylamine), 1,4-diaminocyclohexane, 2-methylpentanediamine, 1,2-diaminocyclohexane, 1,3-diaminopropane, 1,4-diaminobutane, 2,5-dimethylpiperazine, piperazine, fluorine-containing 1,2-diaminobenzenes, N,N'-dimethylethylenediamine, diethylenetriamine, bis(3-aminopropyl)amine, tris(2-aminoethyl)amine, or mixtures thereof.

17. An addressable display according to claim 1 wherein the second polymer is selected from polyureas, polyurethanes, polyesters, thermotropic liquid crystalline polyesters, polycarbonates, polyamides, polysulfones, poly (urea-urethanes), poly(ester-amides), poly(urea-amides), or mixtures thereof.

18. An addressable display according to claim 1 wherein the first polymer is present in an amount of from about 35 to about 90 percent of the marking particles and wherein the second polymer is present in an amount of from about 5 to about 50 percent by weight of the marking particles.

19. An addressable display according to claim 1 wherein the marking particles further comprise a charge control agent.

20. An addressable display according to claim 1 wherein the marking particles further comprise a colorant.

21. An addressable display according to claim 1 wherein the marking particles are prepared by a process which comprises (a) preparing a core material comprising (1) the spiropyran, (2) the chelating agent, (3) either (i) at least one core monomer and a free radical initiator, (ii) at least one core polymer, or (iii) a mixture of (i) and (ii), and (4) a first shell monomer; (b) forming an organic liquid phase containing the core material which is dispersed into an aqueous phase containing a water soluble surfactant and a second shell monomer to form an oil in water suspension; (c) encapsulating the core material within a polymeric shell by means of an interfacial polymerization reaction between the first shell monomer and the second shell monomer; and (d) subsequent to the interfacial polymerization reaction, optionally polymerizing the core monomers via free radical polymerization.

22. A process which comprises (a) providing an addressable display according to claim 1, and (b) effecting a photochromic change in at least some of the marking particles from a first state corresponding to a first absorption spectrum to a second state corresponding to a second absorption spectrum, thereby generating a visible image on the addressable display.

23. A process according to claim 22 further comprising the step of causing the marking particles in the second state to undergo another photochromic change, thereby returning them to the first state and erasing the visible image.

* * * * *